US009970505B2

(12) United States Patent
Teraoka et al.

(10) Patent No.: US 9,970,505 B2
(45) Date of Patent: May 15, 2018

(54) SHOCK ABSORBER

(71) Applicant: KAYABA INDUSTRY CO., LTD., Tokyo (JP)

(72) Inventors: Takashi Teraoka, Gifu (JP); Tatsuya Masamura, Gifu (JP)

(73) Assignee: KYB Corporation, Tokyo (JP)

( * ) Notice: Subject to any disclaimer, the term of this patent is extended or adjusted under 35 U.S.C. 154(b) by 88 days.

(21) Appl. No.: 14/778,213

(22) PCT Filed: Mar. 20, 2014

(86) PCT No.: PCT/JP2014/057916
§ 371 (c)(1),
(2) Date: Sep. 18, 2015

(87) PCT Pub. No.: WO2014/148637
PCT Pub. Date: Sep. 25, 2014

(65) Prior Publication Data
US 2016/0281815 A1    Sep. 29, 2016

(30) Foreign Application Priority Data

Mar. 22, 2013   (JP) .................................. 2013-060604

(51) Int. Cl.
*F16F 9/516* (2006.01)
*F16F 9/18* (2006.01)
(Continued)

(52) U.S. Cl.
CPC ............ *F16F 9/5165* (2013.01); *F16F 9/061* (2013.01); *F16F 9/187* (2013.01); *F16F 9/34* (2013.01); *F16F 9/5126* (2013.01)

(58) Field of Classification Search
CPC .... B60G 17/08; B60G 13/08; B60G 2202/24; B60G 2500/104; B60G 2500/114;
(Continued)

(56) References Cited

U.S. PATENT DOCUMENTS

| 2005/0056504 A1* | 3/2005 | Holiviers | F16F 9/325 |
| | | | 188/322.2 |
| 2010/0065765 A1* | 3/2010 | Forche | B60G 17/08 |
| | | | 251/129.08 |
| 2011/0290603 A1* | 12/2011 | Yabe | F16F 9/348 |
| | | | 188/282.1 |

FOREIGN PATENT DOCUMENTS

| EP | 2103835 A1 | 9/2009 |
| EP | 2546543 A1 | 1/2013 |

(Continued)

*Primary Examiner* — Robert A. Siconolfi
*Assistant Examiner* — San M Aung
(74) *Attorney, Agent, or Firm* — Rabin & Berdo, P.C.

(57) ABSTRACT

Shock absorber including a suction passage allowing flow only from a reservoir towards a pressure side chamber, a rectifying passage allowing flow only from the pressure side chamber towards an expansion side chamber, and a damping force variable valve allowing flow only from the expansion side chamber towards the reservoir. A large pressure-side pressure chamber communicating with the pressure side chamber, and an outer peripheral expansion-side pressure chamber communicating with the expansion side chamber sandwich a free piston slidably moving within a bottom housing forming a pressure chamber. Because a pressure-side pressure-receiving area of the free piston is larger than an expansion-side pressure-receiving area in a contraction operation in which a piston moves downward, the free piston can move downward even in a uniflow-type shock absorber in which pressure in the expansion side and pressure side chambers become equal whereby damping force can be reduced during an input of high-frequency vibration.

9 Claims, 20 Drawing Sheets

(51) Int. Cl.
*F16F 9/06* (2006.01)
*F16F 9/34* (2006.01)
*F16F 9/512* (2006.01)

(58) Field of Classification Search
CPC ............ B60G 2600/182; F16F 2222/12; F16F 2228/066; F16F 9/32; F16F 9/34; F16F 9/46; F16F 9/50; F16F 9/187; F16F 9/348; F16F 9/465; F16F 9/504; F16F 9/512; F16F 9/5126; F16F 9/3484; F16K 1/34
USPC ... 188/269, 266, 282.1, 322.15, 280, 322.14
See application file for complete search history.

(56) References Cited

FOREIGN PATENT DOCUMENTS

| | | | | | |
|---|---|---|---|---|---|
| JP | 58065340 | A | * | 4/1983 | ................ F16F 9/34 |
| JP | 58065340 | A | * | 4/1983 | |
| JP | 05209645 | A | * | 8/1993 | ................ F16F 9/46 |
| JP | 05209645 | A | * | 8/1993 | ................ F16F 9/46 |
| JP | 2009-222136 | A | | 10/2009 | |
| JP | 2012-197905 | A | | 10/2012 | |
| WO | WO-2012102125 | A1 | * | 8/2012 | |

* cited by examiner

SHOCK ABSORBER

TECHNICAL FIELD

The present invention relates to improvement of a shock absorber.

BACKGROUND ART

A shock absorber includes a cylinder, a piston, a piston rod, an expansion side chamber, a pressure side chamber, an intermediate pipe, an outer pipe, a suction passage, a rectifying passage, and a damping force variable valve. The piston is slidably inserted into the cylinder. The piston rod is inserted into the cylinder to couple to the piston. The expansion side chamber and the pressure side chamber are defined by the piston. The intermediate pipe covers the outer periphery of the cylinder to form a discharge passage with the cylinder. The outer pipe covers the outer periphery of the intermediate pipe to form a reservoir with the intermediate pipe. The suction passage allows only a flow of operation oil from the reservoir toward the pressure side chamber. The rectifying passage is disposed in the piston, and allows only a flow of operation oil from the pressure side chamber toward the expansion side chamber. The damping force variable valve is disposed between the discharge passage and the reservoir.

During expansion and contraction, the shock absorber causes the actions of the rectifying passage and the suction passage such that the operation oil flows out to the reservoir from the inside of the cylinder through the discharge passage. Adjusting the resistance provided to this flow of the operation oil in the damping force variable valve allows adjusting the damping force generated by the shock absorber (for example, see JP2009-222136A).

Thus, the shock absorber allows adjusting the damping force. This allows generating a damping force appropriate for vibration of a vehicle body, so as to improve the ride comfort in the vehicle. The shock absorber having the damping force variable valve outside the cylinder has an advantage that ensures a stroke length and allows maintaining the mountability on a vehicle compared with a shock absorber having the damping force variable valve inside the piston.

SUMMARY OF INVENTION

A solenoid is used to adjust the damping force in the shock absorber having the damping force variable valve. The thrust provided by the solenoid to a pilot valve for controlling the valve opening pressure of the damping force variable valve is adjusted to adjust the resistance provided to the flow of the operation oil by the damping force variable valve.

To generate the damping force appropriate for reducing the vibration of the vehicle in the shock absorber, an electronic control device referred to as an Electronic Control Unit (ECU) obtains an appropriate damping force from vibration information, which is detected by various sensors, of the vehicle body of the vehicle to transmit a control command to a driver that drives the solenoid.

At present, the frequency of the vibration of the vehicle body to allow vibration damping by adjusting the damping force by the shock absorber is limited to the upper limit of around several Hz by the responsiveness of the damping force variable valve and the arithmetic processing speed of the ECU. Accordingly, it is difficult to reduce the vibration at a frequency equal to or more than the upper limit.

However, the frequency of the vehicle body vibration that determines ride comfort in the vehicle is a higher frequency than the frequency band that allows vibration damping. A conventional shock absorber does not allow reducing the vibration at this high frequency, and thus it is requested to further improve the ride comfort in the vehicle.

An object of the present invention is to provide a shock absorber that allows improving the ride comfort in the vehicle.

According to an aspect of the present invention, a shock absorber includes: a cylinder; a piston slidably inserted into the cylinder, the piston defining an expansion side chamber and an pressure side chamber inside the cylinder; a reservoir; a suction passage that allows only a flow of liquid from the reservoir toward the pressure side chamber; a rectifying passage that allows only a flow of liquid from the pressure side chamber toward the expansion side chamber; a damping force adjusting unit that allows only a flow of liquid from the expansion side chamber toward the reservoir, the damping force adjusting unit being configured to change resistance provided to the flow of liquid; a housing that forms a pressure chamber; and a free piston slidably inserted into the pressure chamber to form an expansion-side pressure chamber and a pressure-side pressure chamber inside the pressure chamber, the expansion-side pressure chamber communicating with the expansion side chamber, the pressure-side pressure chamber communicating with the pressure side chamber. A pressure derived from the pressure side chamber acts on the free piston to press the free piston to one side in a sliding direction, and a pressure derived from the expansion side chamber acts on the free piston to press the free piston to another side in the sliding direction. A pressure-side pressure-receiving area on which the pressure-side-chamber-derived pressure of the free piston acts is larger than an expansion-side pressure-receiving area on which the expansion-side-chamber-derived pressure of the free piston acts.

DESCRIPTION OF EMBODIMENTS

Hereinafter, a shock absorber according to an embodiment of the present invention will be described with reference to the drawings. In the following, the upper side is described as "above" and the lower side is described as "below" in the respective drawings other than the attenuation characteristic diagram.

Figure 1:
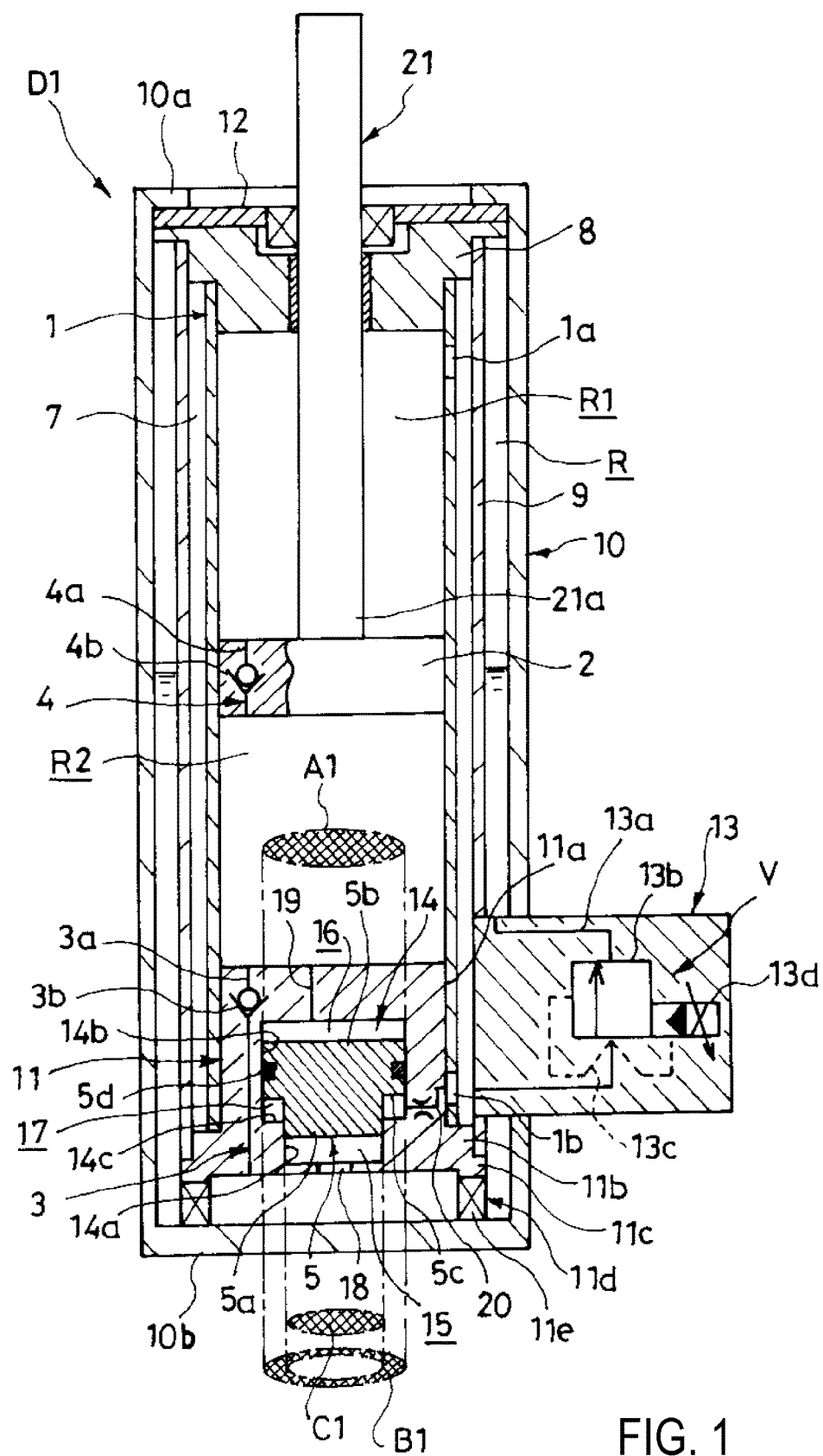
FIG. 1 is a vertical cross-sectional view of a shock absorber according to an embodiment.

As illustrated in FIG. 1, a shock absorber D1 includes a cylinder 1, a piston 2, a reservoir R, a suction passage 3, a rectifying passage 4, a damping force variable valve V, a bottom member 11, and a free piston 5.

The piston 2 is slidably inserted into the cylinder 1, and defines the expansion side chamber R1 and the pressure side chamber R2 inside the cylinder 1. The suction passage 3 allows only a flow of liquid from the reservoir R toward the pressure side chamber R2. The rectifying passage 4 allows only a flow of liquid from the pressure side chamber R2 toward the expansion side chamber R1. The damping force variable valve V is a damping force adjusting unit that allows only a flow of liquid from the expansion side chamber R1 toward the reservoir R and allows changing the resistance provided to the flow of liquid. The bottom member 11 is a housing that forms a pressure chamber 14.

The free piston 5 is slidably inserted into the pressure chamber 14 so as to form: an outer peripheral chamber 17 as an expansion-side pressure chamber, which communicates with the inside of the expansion side chamber R1; and a large chamber 16 as a pressure-side pressure chamber, which communicates with the pressure side chamber R2, inside the pressure chamber 14. The free piston 5 is affected by: the pressure derived from the pressure side chamber to press the free piston 5 downward on one side in the sliding direction; and the pressure derived from the expansion side chamber to press the free piston 5 upward on the other side in the sliding direction.

The shock absorber D1 includes a piston rod 21, which is movably inserted through the inside of the cylinder 1. The piston rod 21 has: one end 21a coupled to the piston 2; and an upper end as the other end slidably journaled by a ring-shaped rod guide 8, which seals the upper end of the cylinder 1, so as to protrude outward. Furthermore, the shock absorber D1 includes an intermediate pipe 9 and an outer pipe 10. The intermediate pipe 9 covers the outer periphery of the cylinder 1 to form a discharge passage 7, which communicates between the expansion side chamber R1 and the reservoir R, with the cylinder 1. The outer pipe 10 in a bottomed cylindrical shape covers the outer periphery of the intermediate pipe 9 to form the reservoir R with the intermediate pipe 9. The damping force variable valve V is disposed between the discharge passage 7 and the reservoir R. The lower ends of the cylinder 1 and the intermediate pipe 9 are sealed by the bottom member 11 as the housing. In the bottom member 11, the pressure chamber 14 and the suction passage 3 are disposed.

The insides of the expansion side chamber R1, the pressure side chamber R2, and the pressure chamber 14 are filled with liquid such as operation oil. The inside of the reservoir R is filled with liquid and gas. The liquid may employ, for example, liquid such as water and water solution other than the operation oil.

The following describes the respective portions of the shock absorber D1 in detail. The piston 2 couples to the one end 21a as the lower end of the piston rod 21 movably inserted through the inside of the cylinder 1. The portion between the piston rod 21 and the rod guide 8, which journals this piston rod 21, is sealed by a sealing member 12 so as to keep the inside of the cylinder 1 in a liquid-tight state.

The rod guide 8 gradually increases in outer diameter so as to fit the cylinder 1, the intermediate pipe 9, and the outer pipe 10. The upper end openings of the cylinder 1, the intermediate pipe 9, and the outer pipe 10 are obstructed by the rod guide 8.

The bottom member 11 fits the lower end of the cylinder 1. The bottom member 11 includes a small-diameter portion 11a, a middle-diameter portion 11b, a large-diameter portion 11c, a pipe portion 11d, and a plurality of cutouts 11e. The small-diameter portion 11a fits the inside of the cylinder 1. The middle-diameter portion 11b fits the inside of the intermediate pipe 9 whose outer diameter is larger than that of the small-diameter portion 11a. The large-diameter portion 11c is disposed on the lower end side of the middle-diameter portion 11b, and has an outer diameter larger than that of the middle-diameter portion 11b. The pipe portion 11*d* is disposed on the lower end side of the large-diameter portion 11*c*. The plurality of cutouts 11*e* is disposed in the pipe portion 11*d*.

The outer pipe 10 internally houses the bottom member 11, the cylinder 1, the intermediate pipe 9, the rod guide 8, and the sealing member 12. The upper end of the outer pipe 10 is crimped such that the bottom member 11, the cylinder 1, the intermediate pipe 9, the rod guide 8, and the sealing member 12 are pinched by a crimp portion 10*a* of the outer pipe 10 and a bottom portion 10*b* of the outer pipe 10, so as to secure these members to the outer pipe 10. Instead of crimping the opening end of the outer pipe 10, a cap to be screwed to the opening end may be disposed such that the cap and the bottom portion 10*b* pinch the bottom member 11, the cylinder 1, the intermediate pipe 9, the rod guide 8, and the sealing member 12.

The suction passage 3 disposed in the bottom member 11 includes a passage 3*a*, which communicates between the reservoir R and the pressure side chamber R2, and a check valve 3*b*, which is disposed in the passage 3*a*. Specifically, the passage 3*a* has one side opened in the upper end of the small-diameter portion 11*a* of the bottom member 11 and the other side opened in the lower end of the large-diameter portion 11*c*. The passage 3*a* opened in the lower end of the large-diameter portion 11*c* communicates with the reservoir R through the cutout 11*e*. The check valve 3*b* opens only in the case where liquid flows from the reservoir R toward the pressure side chamber R2. The suction passage 3 allows only a flow of liquid from the reservoir R toward the pressure side chamber R2 and blocks a flow to the opposite direction, so as to be set as a one-way passage.

The piston 2 includes the rectifying passage 4, which allows only a flow of liquid from the pressure side chamber R2 toward the expansion side chamber R1. The rectifying passage 4 includes a passage 4*a*, which causes the pressure side chamber R2 to communicate with the expansion side chamber R1, and a check valve 4*b* disposed in the passage 4*a*. The check valve 4*b* opens only in the case where liquid flows from the pressure side chamber R2 toward the expansion side chamber R1. The rectifying passage 4 allows only a flow of liquid from the pressure side chamber R2 toward the expansion side chamber R1 and blocks a flow to the opposite direction, so as to be set as a one-way passage.

Adjacent to the upper end of the cylinder 1, a through hole 1*a* facing the expansion side chamber R1 is disposed. The expansion side chamber R1 communicates with a ring-shaped gap formed between the cylinder 1 and the intermediate pipe 9 through the through hole 1*a*. The ring-shaped gap between the cylinder 1 and the intermediate pipe 9 forms the discharge passage 7, which communicates between the expansion side chamber R1 and the reservoir R. The damping force variable valve V is disposed in a valve block 13 secured by being bridged between the outer pipe 10 and the intermediate pipe 9. The damping force variable valve V includes a flow passage 13*a*, a valve element 13*b*, a pilot passage 13*c*, and a pressing device 13*d*. The flow passage 13*a* couples the discharge passage 7 inside the intermediate pipe 9 to the reservoir R. The valve element 13*b* is disposed in the middle of the flow passage 13*a*. The pilot passage 13*c* causes the pressure of the expansion side chamber R1 in the upstream side of the valve element 13*b* to act to press the valve element 13*b* in the valve opening direction. The pressing device 13*d* generates the pressing force pressing the valve element 13*b* in the valve closing direction and causes a variable pressing force. The pressing device 13*d* illustrated in FIG. 1 controls the pressure pressing the valve element 13*b* in the valve closing direction using a solenoid, and allows changing this pressure corresponding to the current supply amount supplied to the solenoid from outside. The pressing device 13*d* is not limited to this, but may directly press the valve element 13*b* using an actuator such as a solenoid. The pressing device 13*d* may be any type insofar as the pressing device 13*d* can change the pressing force corresponding to the current amount or the voltage amount to be supplied. In the case where the liquid is magneto-rheological fluid, instead of the damping force variable valve V, a damping force adjusting unit that cause a magnetic field acting on the flow passage that communicates between the discharge passage 7 and the reservoir R to, for example, a coil or similar member may be used. In this case, the current amount supplied from outside is used to adjust the size of the magnetic field so as to change the resistance provided to the flow of the magneto-rheological fluid passing through the flow passage. In the case where the fluid is electrorheological fluid, the damping force adjusting unit may cause an electric field acting on the flow passage that communicates between the discharge passage 7 and the reservoir R. In this case, the size of the electric field is adjusted by the voltage provided from outside so as to change the resistance provided to the electrorheological fluid flowing through the flow passage.

When the shock absorber D1 performs a contraction operation, the piston 2 moves downward to compress the pressure side chamber R2 so as to move the liquid inside the pressure side chamber R2 to the expansion side chamber R1 via the rectifying passage 4. During the contraction operation, the piston rod 21 enters the inside of the cylinder 1. This causes an excessive amount of liquid corresponding to the entrance volume of the piston rod inside the cylinder 1. The excessive liquid is extruded from the cylinder 1 so as to be discharged to the reservoir R via the discharge passage 7. The shock absorber D1 causes the damping force variable valve V to provide resistance to the flow of liquid moving to the reservoir R through the discharge passage 7, to increase the pressure inside the cylinder 1 so as to generate a pressure-side damping force.

On the other hand, when the shock absorber D1 performs an expansion operation, the piston 2 moves upward to compress the expansion side chamber R1 so as to move the liquid inside the expansion side chamber R1 to the reservoir R via the discharge passage 7. During the expansion operation, the piston 2 moves upward so as to enlarge the volume of the pressure side chamber R2. However, the liquid equivalent to the enlargement is supplied from the reservoir R via the suction passage 3. The shock absorber D1 causes the damping force variable valve V to provide resistance to the flow of liquid that is discharged from the expansion side chamber R1, passes through the discharge passage 7, and moves to the reservoir R. This increases the pressure inside the expansion side chamber R1 so as to generate an expansion-side damping force.

Thus, with the expansion and contraction operation, the shock absorber D1 constantly discharges liquid from the inside of the cylinder 1 via the discharge passage 7 to the reservoir R. The shock absorber D1 is a uniflow-type shock absorber that circulates liquid through the pressure side chamber R2, the expansion side chamber R1, and the reservoir R in this order as a one-way passage, and causes the single damping force variable valve V to generate the damping forces on both the expansion and pressure sides. Setting the cross-sectional area of the piston rod 21 to half of the cross-sectional area of the piston 2 allows setting the identical amounts of operation oil discharged from the inside of the cylinder 1 on both the expansion and pressure sides insofar as the amplitudes of the piston 2 are identical. Accordingly, setting the identical resistances provided to the flows on both the expansion and pressure sides by the damping force variable valve V ensures the identical damping forces on the expansion side and the pressure side.

The pressure chamber 14 is formed by a hollow portion disposed in the bottom member 11. The pressure chamber 14 has different cross-sectional areas perpendicular to the above-below direction on the lower side and the upper side, and includes a small-cross-sectional-area portion 14a having a small cross-sectional area on the lower side, a large-cross-sectional-area portion 14b having a cross-sectional area larger than the small-cross-sectional-area portion 14a on the upper side, and a stepped portion 14c disposed in the middle of the small-cross-sectional-area portion 14a and the large-cross-sectional-area portion 14b.

The free piston 5 is slidably inserted into the pressure chamber 14. The free piston 5 has a stepped shape, and includes a small-piston portion 5a, a large-piston portion 5b, and a stepped portion 5c. The small-piston portion 5a is slidably inserted into the small-cross-sectional-area portion 14a of the pressure chamber 14. The large-piston portion 5b is disposed over the small-piston portion 5a, and is slidably inserted into the large-cross-sectional-area portion 14b of the pressure chamber 14. The stepped portion 5c is disposed between the small-piston portion 5a and the large-piston portion 5b. The free piston 5 can move in the above-below direction. The small-cross-sectional-area portion 14a and the large-cross-sectional-area portion 14b in the pressure chamber 14 only need to be formed along the sliding direction of the free piston 5.

The free piston 5 causes the small-piston portion 5a to be slidably inserted into the small-cross-sectional-area portion 14a, so as to define the small chamber 15 under the small-piston portion 5a inside the small-cross-sectional-area portion 14a. The free piston 5 causes the large-piston portion 5b to be slidably inserted into the large-cross-sectional-area portion 14b, so as to define the large chamber 16 over the large-piston portion 5b inside the large-cross-sectional-area portion 14b. The free piston 5 defines the outer peripheral chamber 17 between the stepped portion 5c and the stepped portion 14c inside the large-cross-sectional-area portion 14b and on the outer periphery of the small-piston portion 5a. On the outer periphery of the large-piston portion 5b of the free piston 5, a sealing ring 5d in slidable contact with the inner periphery of the large-cross-sectional-area portion 14b is mounted. Accordingly, the large chamber 16 and the outer peripheral chamber 17 do not communicate with each other through the outer periphery of the free piston 5. To prevent the communication between the outer peripheral chamber 17 and the small chamber 15, a sealing ring may be disposed in the outer periphery of the small-piston portion 5.

The small chamber 15 communicates with the reservoir R through a passage 18 and the cutout 11e, which are disposed in the bottom member 11, such that the pressure derived from the reservoir R acts on the small chamber 15. The large chamber 16 communicates with the pressure side chamber R2 through a pressure side passage 19, which is opened in the upper end of the small-diameter portion 11a of the bottom member 11 and is opened in the upper end of the large-cross-sectional-area portion 14b. The pressure derived from the pressure side chamber R2 acts on the large chamber 16, and the large chamber 16 functions as the pressure-side pressure chamber communicating with the pressure side chamber R2.

The outer peripheral chamber 17 couples to the discharge passage 7 through the expansion side passage 20, which is disposed in the bottom member 11 and includes an orifice in the middle, and a through hole 1b, which faces the expansion side passage 20 and is disposed adjacent to the lower end of the cylinder 1. The discharge passage 7 communicates with the expansion side chamber R1 and thus the outer peripheral chamber 17, which communicates the discharge passage 7, communicates with the expansion side chamber R1. Accordingly, the pressure derived from the expansion side chamber R1 acts on the outer peripheral chamber 17, and the outer peripheral chamber 17 functions as an expansion-side pressure chamber. The outer peripheral chamber 17 communicates with the expansion side chamber R1 using the discharge passage 7, which guides liquid to the damping force variable valve V disposed to ensure a uniflow structure of the shock absorber D1. Accordingly, it is not necessary to dispose another passage communicating between the outer peripheral chamber 17 and the expansion side chamber R1 even when the pressure chamber 14 is disposed in the bottom member 11. Thus, there is an advantage in cost reduction and weight reduction of the shock absorber D1.

The pressure inside the large chamber 16, that is, the pressure (the pressure derived from the pressure side chamber) introduced from the pressure side chamber R2 acts on the horizontal surface (a pressure-side pressure-receiving area A1) of the large-piston portion 5b of the free piston 5, so as to press the free piston 5 downward as the direction to compress the small chamber 15 and the outer peripheral chamber 17. It should be noted that, the horizontal surface is a surface perpendicular to the above-below direction in FIG. 1. The pressure-side pressure-receiving area A1 is an area surrounded by the outer edge of the cross-sectional surface obtained by cutting the large-piston portion 5b in the horizontal direction.

On the other hand, the pressure inside the outer peripheral chamber 17, that is, the pressure (the pressure derived from the expansion side chamber) introduced from the expansion side chamber R1 acts on the horizontal surface (an expansion-side pressure-receiving area B1) of the free piston 5 defining the outer peripheral chamber 17. Furthermore, the pressure inside the small chamber 15, that is, the pressure of the reservoir R acts on the horizontal surface (a pressure-receiving area C1) of the small-piston portion 5a of the free piston 5 so as to press the free piston 5 upward as the direction to compress the large chamber 16. It should be noted that, the horizontal surface is a surface perpendicular to the above-below direction in FIG. 1. The expansion-side pressure-receiving area B1 is an area surrounded by: the outer edge of the cross-sectional surface obtained by cutting the large-piston portion 5b in the horizontal direction; and the outer edge of the cross-sectional surface obtained by cutting the small-piston portion 5a in the horizontal direction. The pressure-receiving area C1 is an area surrounded by the outer edge of the cross-sectional surface obtained by cutting the small-piston portion 5a in the horizontal direction.

Thus, the pressure derived from the pressure side chamber acts on the free piston 5 so as to press the free piston 5 to one side (downward in FIG. 1) in the sliding direction, and the pressure derived from the expansion side chamber acts on the free piston 5 so as to press the free piston 5 to the other side (upward in FIG. 1) in the sliding direction. The pressure-side pressure-receiving area A1 on which the pressure-side-chamber-derived pressure of the free piston 5 acts is set to be larger than the expansion-side pressure-receiving area B1 on which the expansion-side-chamber-derived pressure of the free piston 5 acts. The pressure derived from the reservoir R acts on the pressure-receiving area C1 other than the expansion-side pressure-receiving area B1 on which the expansion-side-chamber-derived pressure acts, that is, the surface facing the small chamber 15, so as to press the free piston 5 to the other side in the sliding direction.

In the case where the specific gravity of the material forming the free piston 5 is heavier than the specific gravity of the liquid, it is possible to set the small-piston portion 5a and the large-piston portion 5b of the free piston 5 to be hollow so as to reduce the weight of the shock absorber D1.

In the shock absorber D1, the pressure chamber 14 employs the free piston 5 to define the outer peripheral chamber 17 as the expansion-side pressure chamber and the large chamber 16 as the pressure-side pressure chamber. Movement of the free piston 5 changes the volumes of the large chamber 16 and the outer peripheral chamber 17.

In the case where the shock absorber D1 performs an expansion operation, the piston 2 moves upward such that liquid is discharged from the expansion side chamber R1, which is compressed, to the reservoir R through the damping force variable valve V and liquid is supplied to the pressure side chamber R2, which is enlarged, from the reservoir R through the suction passage 3. The pressure inside the expansion side chamber R1 increases, and the pressure inside the pressure side chamber R2 become approximately equal to the pressure inside the reservoir R.

The large chamber 16 communicates with the pressure side chamber R2 through the pressure side passage 19. Accordingly, the pressure inside the pressure side chamber R2 propagates, and the pressure inside the large chamber 16 becomes the pressure derived from the pressure side chamber R2 so as to be a pressure approximately equal to that inside the reservoir R. The small chamber 15 also communicates with the reservoir R. Accordingly, the inside of the small chamber 15 also has a pressure approximately equal to that inside the reservoir R. On the other hand, the outer peripheral chamber 17 communicates with the expansion side chamber R1. Accordingly, the pressure derived from the expansion side chamber R1 acts inside the outer peripheral chamber 17.

Accordingly, in the case where the shock absorber D1 performs an expansion operation, a pressure approximately equal to the pressure of the reservoir R acts on the pressure-side pressure-receiving area A1 and the other pressure-receiving area C1, and a higher pressure derived from the expansion side chamber R1 than the pressure of the reservoir R acts on the expansion-side pressure-receiving area B1 in the free piston 5. Accordingly, the free piston 5 is moved by being pressed upward. When the free piston 5 moves, liquid flows into the outer peripheral chamber 17 corresponding to the movement amount of the free piston 5 and liquid is discharged from the large chamber 16 to the pressure side chamber R2. In this case, the pressure chamber 14 functions as an apparent flow passage, and the liquid moves from the expansion side chamber R1 to the pressure side chamber R2 while bypassing the damping force variable valve V. The outer peripheral chamber 17 and the expansion side chamber R1 communicate with each other through the expansion side passage 20 including the orifice, so as to reduce the rapid displacement of the free piston 5.

On the other hand, in the case where the shock absorber D1 performs a contraction operation, the piston 2 moves downward. Accordingly, the rectifying passage 4 causes a communication state between the pressure side chamber R2 to be compressed and the expansion side chamber R1 to be enlarged. Then, the liquid from the inside of the cylinder 1 is discharged to the reservoir R through the damping force variable valve V. Accordingly, the pressures inside the expansion side chamber R1 and inside the pressure side chamber R2 are approximately equal to each other and both increase.

The large chamber 16 communicates with the pressure side chamber R2 through the pressure side passage 19. Accordingly, the pressure inside the pressure side chamber R2 propagates, and the pressure inside the large chamber 16 becomes the pressure derived from the pressure side chamber R2. The pressure side chamber R2 is in the communication state with the expansion side chamber R1. Accordingly, the pressure inside the large chamber 16 becomes a pressure approximately equal to that inside the expansion side chamber R1. The outer peripheral chamber 17 also communicates with the expansion side chamber R1 through the expansion side passage 20. Accordingly, the pressure derived from the expansion side chamber R1 acts inside the outer peripheral chamber 17.

Accordingly, in the case where the shock absorber D1 performs a contraction operation, a pressure approximately equal to the pressure of the expansion side chamber R1 acts on the pressure-side pressure-receiving area A1 and the expansion-side pressure-receiving area B1 of the free piston 5, and the pressure of the reservoir R acts on the other pressure-receiving area C1. Accordingly, the free piston 5 is moved by being pressed to the lower side. When the free piston 5 moves, liquid is discharged from the outer peripheral chamber 17 to the discharge passage 7, but liquid flows into the large chamber 16 from the pressure side chamber R2 and liquid is discharged to the reservoir R from the small chamber 15. In this case, the liquid in the amount obtained by subtracting the volume reduction amount of the outer peripheral chamber 17 from the volume expansion amount of the large chamber 16 moves from the inside of the cylinder 1 to the reservoir R. That is, the pressure chamber 14 functions as the apparent flow passage, and the liquid discharged from the small chamber 15 moves from the inside of the cylinder 1 to the reservoir R while bypassing the damping force variable valve V.

Thus, the pressure derived from the pressure side chamber acts on the free piston 5 so as to press the free piston 5 to one side (downward in FIG. 1) in the sliding direction, and the pressure derived from the expansion side chamber acts on the free piston 5 so as to press the free piston 5 to the other side (upward in FIG. 1) in the sliding direction. The pressure-side pressure-receiving area A1 on which the pressure-side-chamber-derived pressure of the free piston 5 acts is set to be larger than the expansion-side pressure-receiving area B1 on which the expansion-side-chamber-derived pressure of the free piston 5 acts. Accordingly, also in the shock absorber that is set as a uniflow type and whose structure provides equal pressures to the expansion side chamber R1 and the pressure side chamber R2 during the contraction operation, the free piston 5 can operate such that the pressure chamber 14 functions as an apparent flow passage.

Here, assume the case where the amplitude of the vibration input to the shock absorber D1 is large and the case where the amplitude is small. In the case where the amplitude is large, the amplitude of the piston 2 is large and the flow rate of the liquid going in and out of the pressure chamber 14 is high. Accordingly, the amplitude of the free piston 5 also becomes large. When the free piston 5 reaches the stroke end in contact with the top portion or the bottom portion of the hollow portion of the bottom member 11, the free piston 5 cannot move further in the identical direction. This eliminates the exchange of liquid between the expansion side chamber R1 and the pressure side chamber R2 via the pressure chamber 14, which functions as the apparent passage, and correspondingly increases the flow rate passing through the damping force variable valve V. Accordingly, the damping force generated by the shock absorber D1 is maintained to be high.

Figure 2:
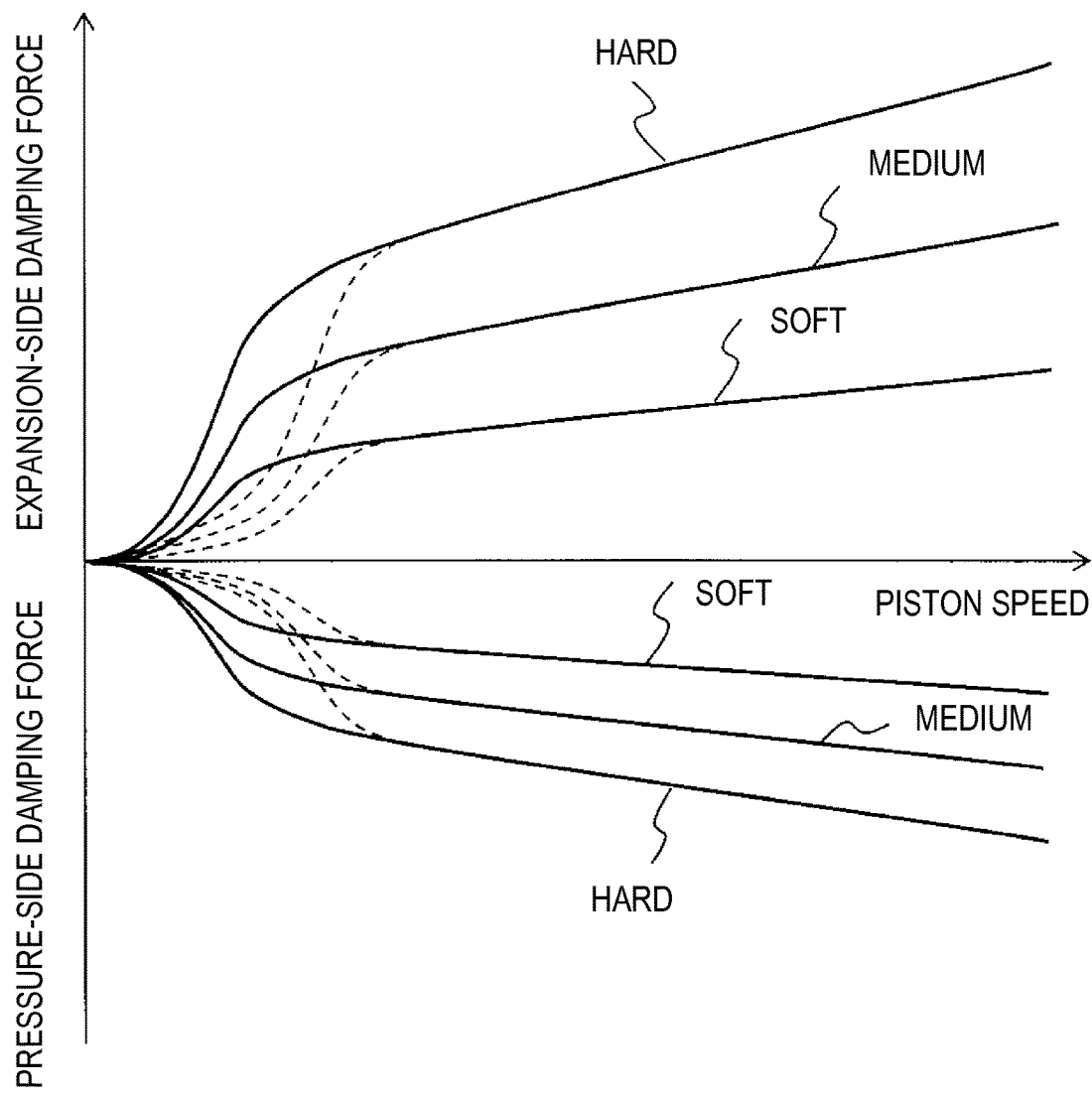
FIG. 2 is an attenuation characteristic diagram of the shock absorber according to the embodiment.

On the other hand, in the case where the amplitude is small, the amplitude of the piston 2 is small and the flow rate of the liquid going in and out of the pressure chamber 14 is also low and thus the amplitude of the free piston 5 becomes small. Accordingly, the free piston 5 can freely move inside the pressure chamber 14. That is, in the case where the shock absorber D1 expands and contracts with a small amplitude, the movement of the free piston 5 inside the pressure chamber 14 is not blocked when the shock absorber D1 is in the expansion stroke or in the contraction stroke. Accordingly, the ratio of the flow rate passing through the apparent flow passage to the flow rate passing through the damping force variable valve V becomes high so as to reduce the damping force generated by the shock absorber D1. The most of the situation where the amplitude of the shock absorber D1 becomes small is during input of a high-frequency vibration. Accordingly, the attenuation characteristics of the shock absorber D1 changes as illustrated in FIG. 2. The respective solid lines in FIG. 2 denote attenuation characteristics in the case where the damping forces on the expansion side and the pressure side of the shock absorber D1 are set to be soft, medium, and hard by the damping force variable valve V as the damping force adjusting unit. The dashed lines denote the characteristics of the damping forces in the case where a high frequency vibration is input to the shock absorber D1 so as to reduce the damping force under the conditions where the soft, medium, and hard attenuation characteristics are set.

As illustrated in FIG. 2, this shock absorber D1 can change the damping force depending on the amplitude during expansion and contraction so as to provide a damping-force reduction effect to a vibration with a small amplitude and generate a high damping force to a vibration with a high amplitude. In the case where the shock absorber D1 intervenes between a spring upper material (the vehicle body) and a spring lower material (the wheel) of the vehicle, the amplitude tends to be small when a high-frequency vibration is input and the amplitude tends to be large when a low-frequency vibration is input. Accordingly, in response to an input of a low-frequency vibration in a resonant frequency band of the spring upper material, the shock absorber D1 generates a high damping force. This allows stabilizing the posture of the vehicle body (the spring upper material) so as to prevent the occupant from feeling uncomfortable during turning of the vehicle. Furthermore, when a high-frequency vibration in a resonant frequency band of the wheel (a spring lower material) of the vehicle is input, the shock absorber D1 generates a low damping force so as to prevent transmission of the vibration on the wheel side (the spring lower material side) to the vehicle body side (the spring upper material side). This allows ensuring satisfactory ride comfort in the vehicle.

The shock absorber D1 can adjust the resistance provided to the flow of liquid by the damping force variable valve V, so as to adjust the damping force. That is, this shock absorber D1 allows the damping force variable valve V to adjust the damping force and in addition, allows reducing the damping force with respect to a high-frequency vibration.

With respect to a vibration in a relatively low frequency band, the shock absorber D1 controls the damping force variable valve V as the damping force adjusting unit to adjust the damping force so as to allow damping the vehicle body vibration. Furthermore, with respect to a high-frequency vibration that cannot be reduced by control of the damping force variable valve V, the shock absorber D1 allows mechanically generating a low damping force. This allows insulating the vibration from the wheel side so as to effectively reduce the vehicle body vibration and dramatically improve the ride comfort in the vehicle.

In the shock absorber D1, the orifice is disposed in the expansion side passage 20, which causes the outer peripheral chamber 17 to communicate with the expansion side chamber R1. Instead or in addition, an orifice may be disposed in one or both of the passage 18 and the pressure side passage 19, or the orifices may be eliminated from all the passages 18, 19, and 20. The passages 18, 19, and 20 may employ not orifices but choke throttles.

Instead of the configuration where the small chamber 15 communicates with the reservoir R, the small chamber 15 may communicate with the outside of the shock absorber D1 so as to be opened to the atmosphere. Also with this configuration, in the case where the shock absorber D1 performs an expansion operation, the free piston 5 is moved by being pressed upward, liquid flows into the outer peripheral chamber 17 corresponding to the movement amount of the free piston 5, and liquid is discharged from the large chamber 16 to the pressure side chamber R2. The pressure chamber 14 functions as the apparent flow passage, and the liquid moves from the expansion side chamber R1 to the pressure side chamber R2 while bypassing the damping force variable valve V. In the case where the shock absorber D1 performs a contraction operation, the free piston 5 is moved by being pressed downward such that the total volume of the outer peripheral chamber 17 and the large chamber 16 is enlarged and the amount of the liquid passing through the damping force variable valve V decreases. Thus, the shock absorber D1 allows providing an effect that reduces the damping force with respect to a high-frequency vibration, similarly to the case where the small chamber 15 communicates with the reservoir R. In the case where the small chamber 15 is opened to the atmosphere, the small chamber 15 need not communicate with the reservoir R. Accordingly, a housing forming the pressure chamber 14 can be secured to the piston rod 21 or disposed inside the piston rod 21. In the case where the small chamber 15 communicates with the reservoir R, it is possible to completely house the pressure chamber 14 within the shock absorber D1 and prevent mixing of gas from the small chamber 15 to the outer peripheral chamber 17 or the large chamber 16.

The cross-sectional shape of the outer periphery of the free piston 5 and the cross-sectional shape of the inner wall of the pressure chamber 14 can employ shapes other than the circular shapes.

Figure 3:
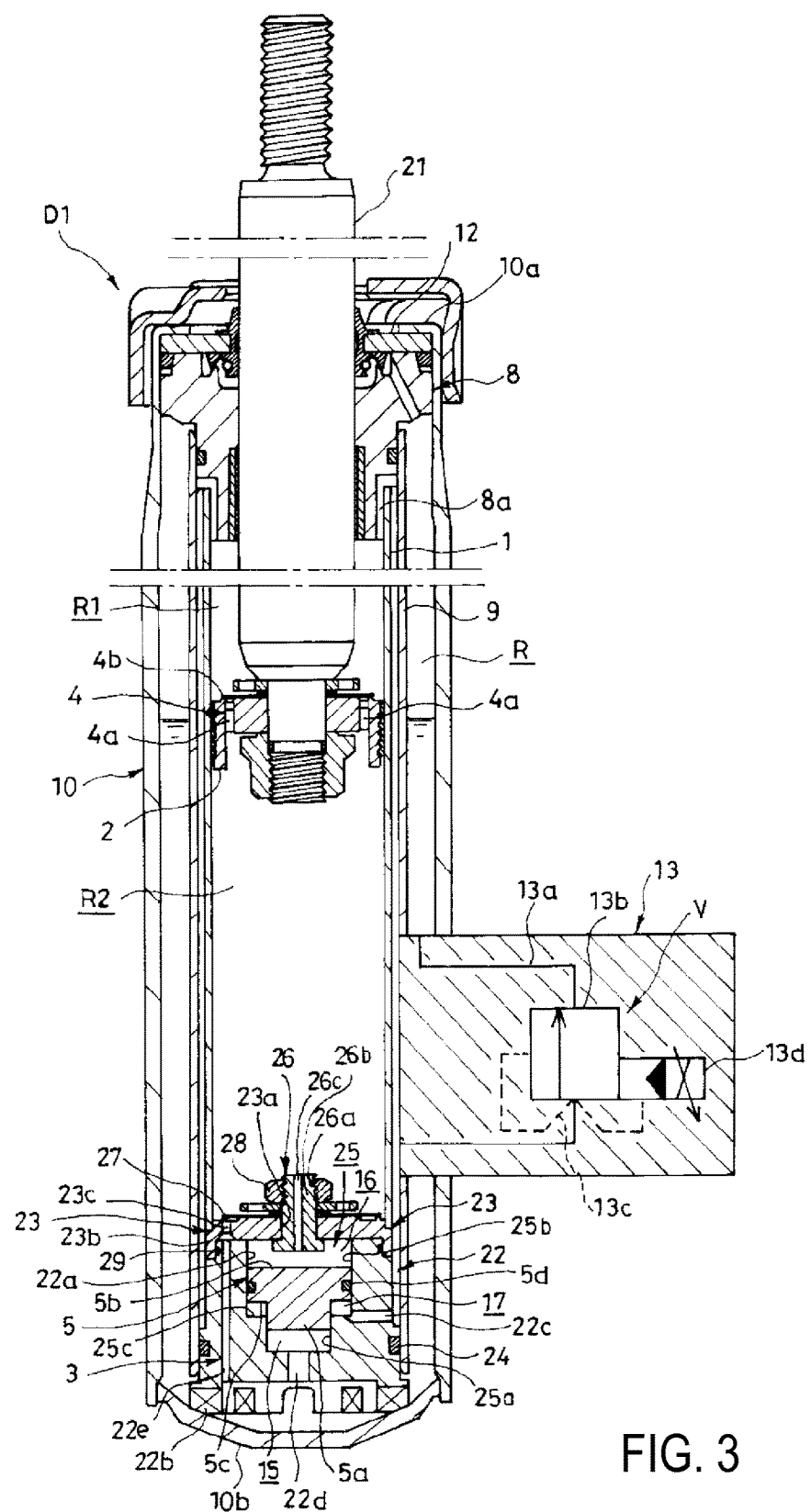
FIG. 3 is a vertical cross-sectional view of one specific example in the shock absorber according to the embodiment.

The following describes a specific configuration of the bottom member 11. For example, as illustrated in FIG. 3, the bottom member 11 includes a case member 22 and a lid member 23. The case member 22 includes a hollow portion 22a into which the free piston 5 is inserted. The lid member 23 obstructs the hollow portion 22a of the case member 22.

The case member 22, which has a columnar shape, has the outer periphery including three stepped portions and has an outer diameter gradually shrinking upward. The outer periphery of the second stepped portion from the bottom of the case member 22 fits the intermediate pipe 9. The third stepped portion from the bottom is positioned inside the intermediate pipe 9 while having a gap with the intermediate pipe 9. The outer diameter of the lowest step of the case member 22 is formed to be larger than the inner diameter of the intermediate pipe 9. In the outer periphery of the second stepped portion, which fits the intermediate pipe 9, from the bottom of the case member 22, a sealing ring 24 is mounted. This prevents communication between the discharge passage 7 and the reservoir R through the outer periphery of the case member 22. The outer periphery of the lowest step of the case member 22 has a cylindrical shape, and includes a plurality of cutouts 22b, which communicate between the inside and outside.

The case member 22 has an upper end that includes the opened hollow portion 22a. The opening portion of the hollow portion 22a is obstructed by the lid member 23 so as to form a pressure chamber 25 inside the case member 22. The hollow portion 22a includes a large-cross-sectional-area portion 25b, which is formed on the opening portion side, and a small-cross-sectional-area portion 25a, which is formed under the large-cross-sectional-area portion 25b and has a diameter smaller than that of the large-cross-sectional-area portion 25b. Between the small-cross-sectional-area portion 25a and the large-cross-sectional-area portion 25b, a stepped portion 25c is formed.

The case member 22 includes a through hole 22c, a passage 22d, and a passage 22e. The through hole 22c is opened in the outer periphery of the third stepped portion from the bottom of the case member 22 and communicates with the stepped portion 25c. The passage 22d communicates with the bottom surface of the hollow portion 22a from the lower end of the case member 22. The passage 22e passes through the case member 22 in the above-below direction.

The lid member 23 has a disk shape, and includes: a circular plate-shaped bolt insertion hole 23a, which is disposed along the above-below direction, in the center; a pipe-shaped socket 23b, which disposed to extend downward, in the outer periphery; and a port 23c, which is disposed along the above-below direction. Fitting of the socket 23b of the lid member 23 onto the distal end of the case member 22 obstructs the hollow portion 22a so as to form the pressure chamber 25 inside the case member 22.

Through the bolt insertion hole 23a, a bolt 26, whose distal end includes a threaded portion 26a, is inserted. On the outer periphery of the shaft portion 26b of the bolt 26, a disk-shaped check valve 27, which is placed on the top surface of the lid member 23, is mounted. The check valve 27 is secured to the lid member 23 by the bolt 26 and a nut 28 screwed to the threaded portion 26a, and opens and closes the port 23c formed in the lid member 23. The bolt 26 includes an axially penetrating passage 26c, and the pressure chamber 25 communicates with the pressure side chamber R2 by the passage 26c.

The hollow portion 22a of the case member 22 internally houses the free piston 5. The inside of the pressure chamber 25 is defined as the small chamber 15, the large chamber 16, and the outer peripheral chamber 17 by insertion of the free piston 5. The small chamber 15 communicates with the reservoir R through the passage 22d, which is disposed in the case member 22. The large chamber 16 communicates with the pressure side chamber R2 through the passage 26c disposed in the bolt 26. The outer peripheral chamber 17 communicates with the discharge passage 7 through the through hole 22c. The through hole 22c, which is opened in the stepped portion 25c, is formed to keep the communication between the outer peripheral chamber 17 and the discharge passage 7 until the free piston 5 is completely brought into close contact with the stepped portion 25c.

When the lid member 23 fits and integrated with the case member 22, the port 23c communicates with the reservoir R through the passage 22e. When the pressure inside the pressure side chamber R2 is reduced during the expansion operation of the shock absorber D1, the check valve 27, which opens and closes the port 23c, is warped on the outer periphery side to open so as to communicate between the reservoir R and the pressure side chamber R2 through the port 23c and the passage 22e. The check valve 27 constitutes the suction passage 3 together with the port 23c and the passage 22e.

In the shock absorber D1 illustrated in FIG. 3, the lower end of the cylinder 1 to fit the bottom member 11 abuts on the upper end of the socket 23b of the lid member 23. Accordingly, when the crimp portion 10a of the outer pipe 10 and the bottom portion 10b of the outer pipe 10 sandwich the case member 22, the lid member 23, and the cylinder 1, the case member 22 and the lid member 23 are pressed against each other by the axial force such that both are integrated without separation. In the outer pipe 10 and the intermediate pipe 9 to which the valve block 13 is secured, the intermediate pipe 9 is not sandwiched by the rod guide 8 and the bottom member 11 from above and below, but is allowed to move in the above-below direction with respect to the rod guide 8 and the bottom member 11. The intermediate pipe 9 is allowed to move in the above-below direction, so as to allow assembling the shock absorber D1 even when some error occurs in the mounting position of the valve block 13. In the shock absorber D1 illustrated in FIG. 3, the expansion side chamber R1 and the discharge passage 7 communicate with each other through a cutout 8a, which is disposed in the rod guide 8. Instead, a hole communicating between both may be disposed in the cylinder 1.

When a sealing ring 29 is mounted on the portion where the lid member 23 and the case member 22 fit each other, the lid member 23 and the case member 22 are sealed so as to prevent direct communication between the discharge passage 7 and the large chamber 16.

With this configuration of the bottom member 11, the respective members constituting the bottom member 11 are incorporated in the shock absorber D1 without difficulty.

Figure 4:
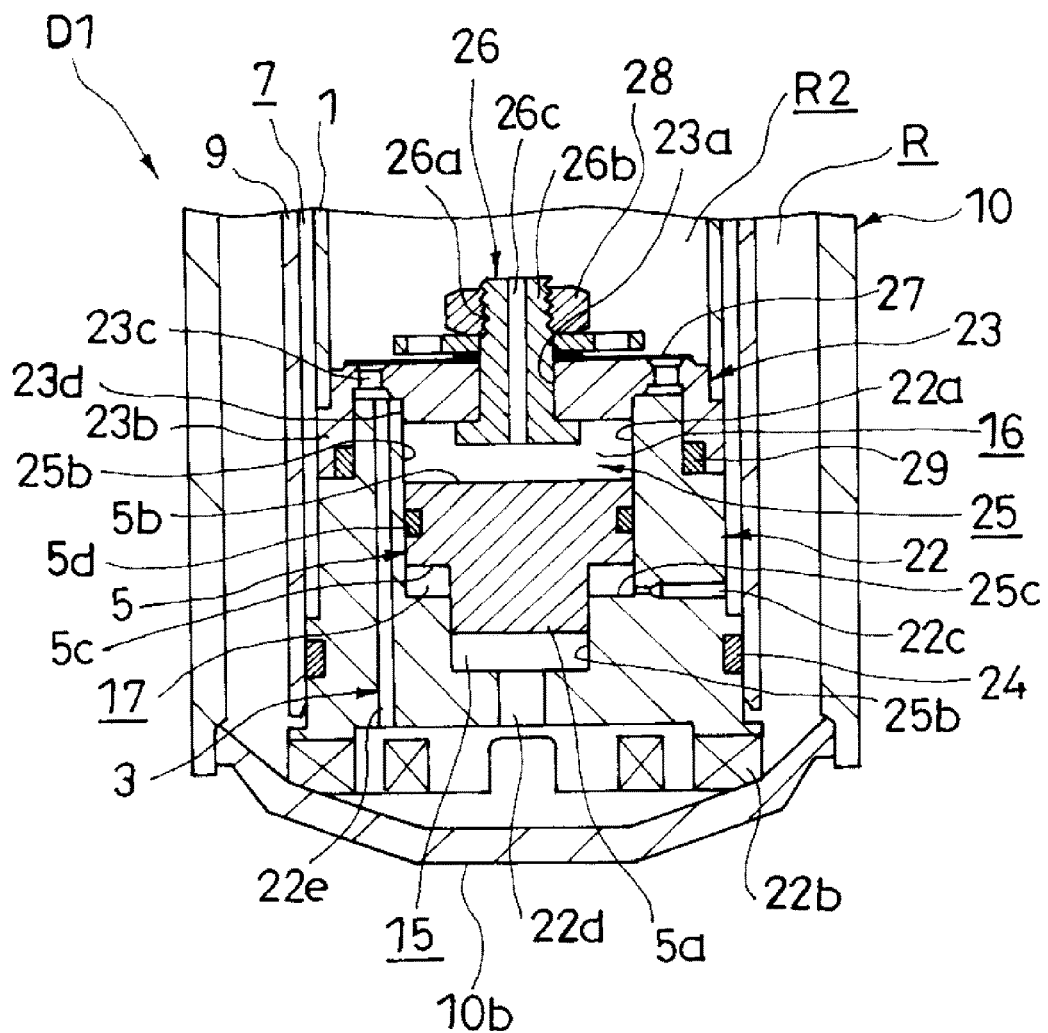
FIG. 4 is a vertical cross-sectional view of a bottom member in another specific example in the shock absorber according to the embodiment.

In the shock absorber D1 illustrated in FIG. 4, the lid member 23 includes a ring-shaped groove 23d, which is press-fitted to the inner periphery of the pipe-shaped distal end of the case member 22. In this ring-shaped groove 23d, the port 23c formed in the lid member 23 is opened. To the inner periphery of the distal end of the case member 22, the wall on the inner peripheral side of the ring-shaped groove 23d is press-fitted without a gap. Accordingly, the communication between the large chamber 16 and the suction passage 3 is blocked so as to generate a stable damping-force reduction effect. The sealing ring 29 may be mounted on the socket 23b side of the lid member 23 to be in close contact with the outer periphery of the distal end of the case member 22. Instead, the sealing ring 29 may be mounted on the outer periphery of the pipe-shaped distal end of the case member 22 so as to be in close contact with the inner periphery of the socket 23b.

Figure 5:
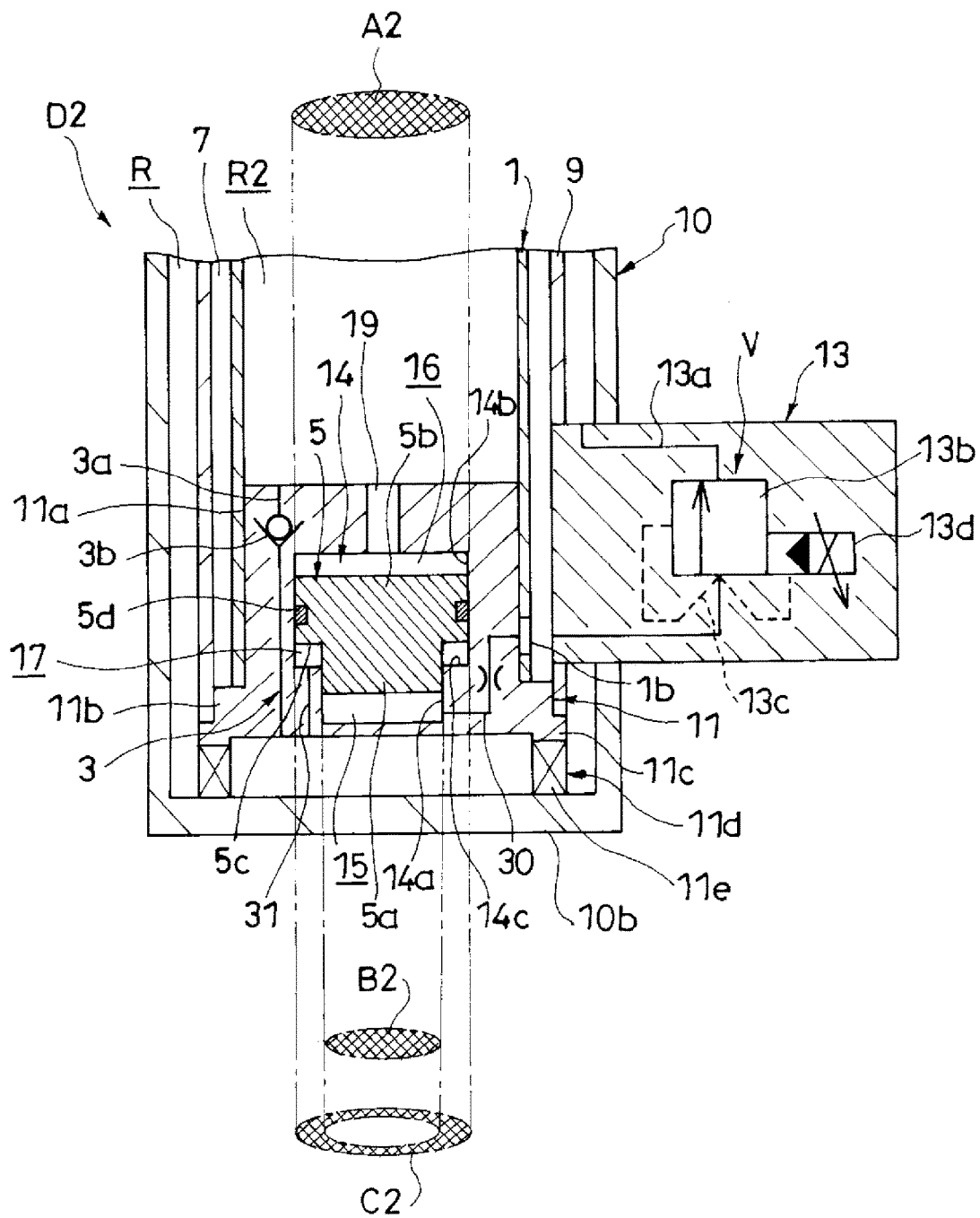
FIG. 5 is a vertical cross-sectional view of a bottom member in a shock absorber according to another embodiment.

According to a shock absorber D2 in another embodiment illustrated in FIG. 5, the outer peripheral chamber 17 communicates with the reservoir R and the small chamber 15 communicates with the expansion side chamber R1 through the expansion side passage 30. The shock absorber D2 illustrated in FIG. 5 differs from the shock absorber D1 only in that, to cause the small chamber 15 to function as the expansion-side pressure chamber, the small chamber 15 communicates with the expansion side chamber R1 through the expansion side passage 30 including an orifice and the outer peripheral chamber 17 communicates with the reservoir R instead. The shock absorber D2 is otherwise similar to the shock absorber D1, and thus the description of the part other than the different part is omitted.

In the shock absorber D2, the small chamber 15 disposed inside the bottom member 11 communicates with the expansion side chamber R1 through the expansion side passage 30, the through hole 1*b* disposed in the cylinder 1, and the discharge passage 7. The outer peripheral chamber 17 communicates with the reservoir R through a passage 31. Similarly to the shock absorber D1, the large chamber 16 communicates with the pressure side chamber R2 through the pressure side passage 19.

Also in this case, the pressure derived from the pressure side chamber acts on the free piston 5 so as to press the free piston 5 to one side (downward in FIG. 5) in the sliding direction, and the pressure derived from the expansion side chamber acts on the free piston 5 so as to press the free piston 5 to the other side (upward in FIG. 5) in the sliding direction. A pressure-side pressure-receiving area A2 on which the pressure-side-chamber-derived pressure of the free piston 5 acts is set to be larger than an expansion-side pressure-receiving area B2 on which the expansion-side-chamber-derived pressure of the free piston 5 acts. The pressure derived from the reservoir R acts on another pressure-receiving area C2 as the area other than the expansion-side pressure-receiving area B2 on which the expansion-side-chamber-derived pressure acts, that is, the surface facing the outer peripheral chamber 17 in the free piston 5, so as to press the free piston 5 to the other side in the sliding direction. Thus, in the shock absorber D2, the small chamber 15 functions as the expansion-side pressure chamber and the large chamber 16 functions as the pressure-side pressure chamber.

In the shock absorber D2, the pressure chamber 14 employs the free piston 5 to define the small chamber 15 as the expansion-side pressure chamber and the large chamber 16 as the pressure-side pressure chamber. Movement of the free piston 5 changes the volumes of the large chamber 16 and the small chamber 15.

In the case where the shock absorber D2 performs an expansion operation, the piston 2 moves upward such that liquid is discharged from the expansion side chamber R1, which is compressed, to the reservoir R through the damping force variable valve V and liquid is supplied to the pressure side chamber R2, which is enlarged, from the reservoir R through the suction passage 3. Accordingly, the pressure inside the expansion side chamber R1 increases, and the pressure inside the pressure side chamber R2 become approximately equal to the pressure inside the reservoir R.

The large chamber 16 communicates with the pressure side chamber R2 through the pressure side passage 19. Accordingly, the pressure inside the pressure side chamber R2 propagates, and the pressure inside the large chamber 16 becomes the pressure derived from the pressure side chamber R2 so as to be a pressure approximately equal to that inside the reservoir R. The outer peripheral chamber 17 also communicates with the reservoir R. Accordingly, the pressure inside the outer peripheral chamber 17 also has a pressure approximately equal to that inside the reservoir R. On the other hand, the small chamber 15 communicates with the expansion side chamber R1. Accordingly, the pressure derived from the expansion side chamber R1 acts inside the small chamber 15.

Accordingly, in the case where the shock absorber D2 performs an expansion operation, a pressure approximately equal to the pressure of the reservoir R acts on the pressure-side pressure-receiving area A2 and the other pressure-receiving area C2, and a higher pressure derived from the expansion side chamber R1 than the pressure of the reservoir R acts on the expansion-side pressure-receiving area B2 in the free piston 5. Accordingly, the free piston 5 is moved by being pressed upward. When the free piston 5 moves upward, liquid flows into the small chamber 15 corresponding to the movement amount of the free piston 5 and liquid is discharged from the large chamber 16 to the pressure side chamber R2. Thus, the pressure chamber 14 functions as an apparent flow passage, and the liquid moves from the expansion side chamber R1 to the pressure side chamber R2 while bypassing the damping force variable valve V. The small chamber 15 and the expansion side chamber R1 communicate with each other through the expansion side passage 30 including the orifice, so as to reduce the rapid displacement of the free piston 5.

On the other hand, in the case where the shock absorber D2 performs a contraction operation, the piston 2 moves downward. Accordingly, the rectifying passage 4 causes a communication state between the pressure side chamber R2 to be compressed and the expansion side chamber R1 to be enlarged. Then, the liquid from the inside of the cylinder 1 is discharged to the reservoir R through the damping force variable valve V. Accordingly, the pressures inside the expansion side chamber R1 and inside the pressure side chamber R2 are approximately equal to each other and both increase.

The large chamber 16 communicates with the pressure side chamber R2 through the pressure side passage 19. Accordingly, the pressure inside the pressure side chamber R2 propagates, and the pressure inside the large chamber 16 becomes the pressure derived from the pressure side chamber R2. At this time, the pressure side chamber R2 is in the communication state with the expansion side chamber R1. Accordingly, the pressure inside the large chamber 16 becomes a pressure approximately equal to that inside the expansion side chamber R1. On the other hand, the small chamber 15 communicates with the expansion side chamber R1 through the expansion side passage 30. Accordingly, the pressure derived from the expansion side chamber R1 acts inside the small chamber 15.

Accordingly, in the case where the shock absorber D2 performs a contraction operation, a pressure approximately equal to the pressure of the expansion side chamber R1 acts on the pressure-side pressure-receiving area A2 and the expansion-side pressure-receiving area B2 of the free piston 5, and the pressure of the reservoir R acts on the other pressure-receiving area C2. Accordingly, in this case, the free piston 5 is moved by being pressed to the lower side. When the free piston 5 moves downward, liquid is discharged from the small chamber 15 to the discharge passage 7, but liquid flows into the large chamber 16 from the pressure side chamber R2 and liquid is discharged to the reservoir R from the outer peripheral chamber 17. Accordingly, in this case, the liquid in the amount obtained by subtracting the volume reduction amount of the small chamber 15 from the volume expansion amount of the large chamber 16, that is, the liquid in the amount corresponding to the volume reduction amount of the outer peripheral chamber 17 moves to the reservoir R. Thus, the pressure chamber 14 functions as the apparent flow passage, and liquid moves from the inside of the cylinder 1 to the reservoir R while bypassing the damping force variable valve V.

Also in the shock absorber D2, the pressure derived from the pressure side chamber acts on the free piston 5 so as to press the free piston 5 to one side (downward in FIG. 5) in the sliding direction, and the pressure derived from the expansion side chamber acts on the free piston 5 so as to press the free piston 5 to the other side (upward in FIG. 5) in the sliding direction. The pressure-side pressure-receiving area A2 on which the pressure-side-chamber-derived pressure of the free piston 5 acts is set to be larger than the expansion-side pressure-receiving area B2 on which the expansion-side-chamber-derived pressure of the free piston 5 acts. Accordingly, even in the shock absorber that is set as a uniflow type and whose structure provides equal pressures to the expansion side chamber R1 and the pressure side chamber R2 during the contraction operation, the free piston 5 can operate such that the pressure chamber 14 functions as an apparent flow passage.

The shock absorber D2 can also change the damping force depending on the size of the amplitude during expansion and contraction of the shock absorber D2. Accordingly, similarly to the shock absorber D1, in response to an input of a low-frequency vibration in a resonant frequency band of the vehicle body (a spring upper material) of the vehicle, the shock absorber D2 generates a high damping force. Thus, this allows stabilizing the posture of the vehicle body (the spring upper material) so as to prevent the occupant from feeling uncomfortable during turning of the vehicle. Furthermore, when a high-frequency vibration in a resonant frequency band of the wheel (a spring lower material) of the vehicle is input, the shock absorber D2 generates a low damping force so as to prevent transmission of the vibration on the wheel side (the spring lower material side) to the vehicle body side (the spring upper material side), so as to allow ensuring satisfactory ride comfort in the vehicle.

The shock absorber D2 can adjust the resistance provided to the flow of liquid by the damping force variable valve V, so as to adjust the damping force. The shock absorber D2 also allows the damping force variable valve V to adjust the damping force and, in addition, allows reducing the damping force with respect to a high-frequency vibration.

With respect to a vibration in a relatively low frequency band, the shock absorber D2 controls the damping force variable valve V to adjust the damping force so as to allow damping the vehicle body vibration. Furthermore, with respect to a high-frequency vibration that cannot be reduced by control of the damping force variable valve V, the shock absorber D2 allows mechanically generating a low damping force. This allows insulating the vibration from the wheel side so as to effectively reduce the vehicle body vibration and dramatically improve the ride comfort in the vehicle.

In the shock absorber D2, the orifice is disposed in the expansion side passage 30, which causes the small chamber 15 to communicate with the expansion side chamber R1. Instead or in addition, an orifice may be disposed in one or both of the pressure side passage 19 and the expansion side passage 31. Alternatively, the orifices may be eliminated from all the passages 19, 30, and 31. The passages 19, 30, and 31 may employ not orifices but choke throttles.

Instead of the configuration where the outer peripheral chamber 17 communicates with the reservoir R, the outer peripheral chamber 17 may communicate with the outside of the shock absorber D2 so as to be opened to the atmosphere. Also with this configuration, in the case where the shock absorber D2 performs an expansion operation, the free piston 5 is moved by being pressed upward, liquid flows into the small chamber 15 corresponding to the movement amount of the free piston 5, and liquid is discharged from the large chamber 16 to the pressure side chamber R2. Accordingly, the pressure chamber 14 functions as the apparent flow passage, and the liquid moves from the expansion side chamber R1 to the pressure side chamber R2 while bypassing the damping force variable valve V. In the case where the shock absorber D2 performs a contraction operation, the free piston 5 is moved by being pressed downward such that the total volume of the outer peripheral chamber 17 and the large chamber 16 is enlarged and the amount of the liquid passing through the damping force variable valve V decreases. The shock absorber D2 allows providing an effect that reduces the damping force with respect to a high-frequency vibration, similarly to the case where the outer peripheral chamber 17 communicates with the reservoir R. In the case where the outer peripheral chamber 17 is opened to the atmosphere or an air chamber, the outer peripheral chamber 17 need not communicate with the reservoir R. Accordingly, a housing forming the pressure chamber 14 can be secured to the piston rod 21 or disposed inside the piston rod 21. In the case where the outer peripheral chamber 17 communicates with the reservoir R, it is possible to completely house the pressure chamber 14 within the shock absorber D2 and prevent mixing of gas from the outer peripheral chamber 17 to the small chamber 15 or the large chamber 16.

Figure 6:
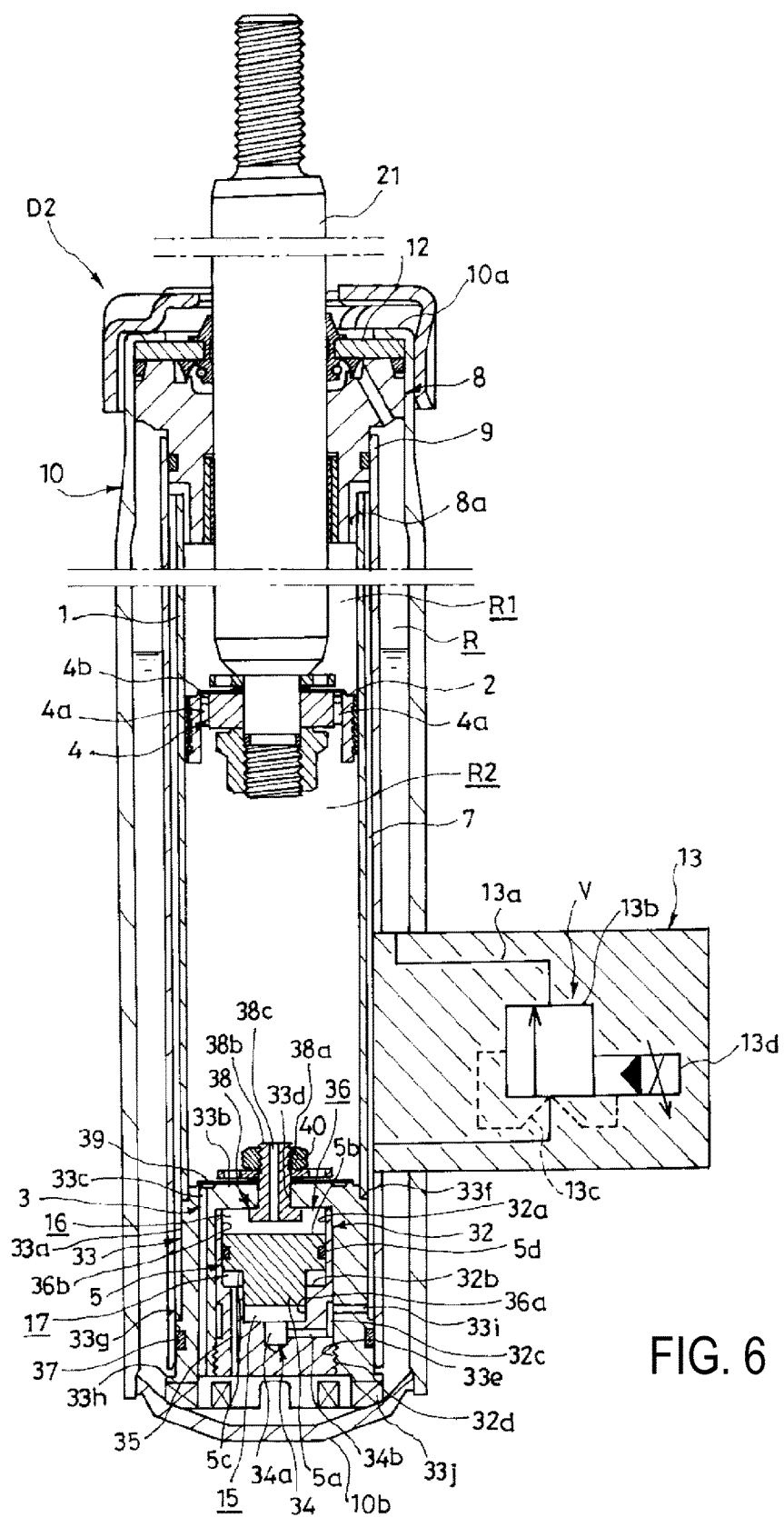
FIG. 6 is a vertical cross-sectional view of one specific example in a shock absorber according to another embodiment.

While in the shock absorber D2 illustrated in FIG. 5 the bottom member 11 is schematically described, for example, as illustrated in FIG. 6, the bottom member 11 may include: a case member 32, which includes a hollow portion 32a to which the free piston 5 is inserted; and a lid member 33, which obstructs the hollow portion 32a of the case member 32.

In FIG. 6, the case member 32 has a bottomed cylindrical shape and includes: the hollow portion 32a, which includes a stepped portion 32b in the inner periphery; a ring-shaped groove 32c, which is disposed in the outer periphery; an expansion side passage 34b, which communicates with the hollow portion 32a from the ring-shaped groove 32c; a communication hole 35, which communicates with the hollow portion 32a from the bottom portion through the stepped portion 32b; and a threaded portion 32d, which is disposed in the outer periphery of the lower end. The hollow portion 32a is obstructed by the lid member 33 so as to form a pressure chamber 36. The bottom portion side of the stepped portion 32b in the hollow portion 32a forms a small-cross-sectional-area portion 36a having a small diameter in the pressure chamber 36. The base end side over the stepped portion 32b forms a large-cross-sectional-area portion 36b having a diameter larger than that of the small-cross-sectional-area portion 36a. The expansion side passage 34 communicates with the small-cross-sectional-area portion 36a, and the communication hole 35 communicates with the large-cross-sectional-area portion 36b. The expansion side passage 34 includes: a vertical hole 34a, which extends downward from the bottom portion of the hollow portion 32a; and a horizontal hole 34b, which communicates between the vertical hole 34a and the ring-shaped groove 32c and functions as an orifice, such that the free piston 5 is not obstructed when the small chamber 15 is maximally compressed.

The lid member 33 has a topped cylindrical shape, and includes a port 33c, a bolt insertion hole 33d, a threaded portion 33e, three stepped portions 33f, 33g, and 33h, and a penetrating hole 33i. The port 33c passes through from the lower end of the pipe portion 33a to the upper end of the top portion 33b. The bolt insertion hole 33d is disposed in the center of the top portion 33b along the above-below direction. The threaded portion 33e is disposed in the inner periphery of the pipe portion 33a. The three stepped portions 33f, 33g, and 33h are disposed in the outer periphery of the pipe portion 33a. The penetrating hole 33i is opened between the first stepped portion 33f and the second stepped portion 33g from the top of the pipe portion 33a, and communicates with the inside. The lower end of the pipe portion 33a includes a cutout 33j to communicate between the inside and outside of the pipe portion 33a.

The first stepped portion 33f from the top of the pipe portion 33a of the lid member 33 abuts on the lower end of the cylinder 1, and the outer periphery of the pipe portion 33a on the upper side of the stepped portion 33f fits the cylinder 1. The outer periphery of the pipe portion 33a between the second stepped portion 33g and the third stepped portion 33h from the top fits the intermediate pipe 9. Between: the outer periphery of the pipe portion 33a between the first stepped portion 33f and the second stepped portion from the top; and the intermediate pipe 9, a ring-shaped gap forming the discharge passage 7 is disposed. On the outer periphery of the pipe portion 33a, which the intermediate pipe 9 fits, a sealing ring 37 is mounted. This prevents communication between the discharge passage 7 and the reservoir R through the gap between the lid member 33 and the intermediate pipe 9. When the case member 32 is inserted into the pipe portion 33a of the lid member 33 and the threaded portion 32d is screwed to the threaded portion 33e, the case member 32 is secured to the lid member 33 and the hollow portion 32a is obstructed so as to form the pressure chamber 36.

Through the bolt insertion hole 33d, a bolt 38 whose distal end includes a threaded portion 38a is inserted. On the outer periphery of a shaft portion 38b of the bolt 38, a disk-shaped check valve 39 is mounted. The check valve 39 is secured to the lid member 33 by a nut 40, which is screwed to the bolt 38 and the threaded portion 38a, so as to open and close the port 33c. In the bolt 38, a passage 38c, which communicates between the pressure chamber 36 and the pressure side chamber R2, is shaped axially penetrating.

Into the hollow portion 32a of the case member 32, the free piston 5 is slidably inserted, and the free piston 5 defines the small chamber 15, the large chamber 16, and the outer peripheral chamber 17 inside the pressure chamber 36. The small chamber 15 communicates with the expansion side chamber R1 through the expansion side passage 34, the penetrating hole 33i, and the discharge passage 7. The large chamber 16 communicates with the pressure side chamber R2 through the passage 38c disposed in the bolt 38. The outer peripheral chamber 17 communicates with the reservoir R through the communication hole 35 and the cutout 33j. The communication hole 35, which opened in the stepped portion 32b, is formed not to cut the communication between the outer peripheral chamber 17 and the reservoir R until the free piston 5 is completely brought into close contact with the stepped portion 32b.

The port 33c disposed in the lid member 33 communicates with the reservoir R through the cutout 33j. When the pressure inside the pressure side chamber R2 is reduced during the expansion operation of the shock absorber D2, the check valve 39, which opens and closes the port 33c, is warped on the outer periphery side to open so as to communicate between the reservoir R and the pressure side chamber R2 through the port 33c. The check valve 39 constitutes the suction passage 3 together with the port 33c.

The lower end of the cylinder 1 abuts on the upper end of the stepped portion 33f of the lid member 33. Accordingly, when the crimp portion 10a and the bottom portion 10b of the outer pipe 10 sandwich the bottom member 11 and the cylinder 1, these members can be immovably secured to the outer pipe 10. Also in the shock absorber D2, similarly to the above-described shock absorber D1, the intermediate pipe 9 is mounted not to be sandwiched by the rod guide 8 and the bottom member 11 from above and below, but to be allowed to move in the above-below direction with respect to the rod guide 8 and the bottom member 11.

In the shock absorber D2 illustrated in FIG. 6, the respective members constituting the bottom member 11 are incorporated in the shock absorber D2 without difficulty. In the shock absorber D2, it is necessary to communicate between: the small chamber 15 disposed downward; and the discharge passage 7 disposed on the upper side of the lower end of the small chamber 15, and the expansion side passage 34 needs to be formed not to be obstructed by the free piston 5. Accordingly, a complicated passage needs to be formed by the expansion side passage 34, the ring-shaped groove 32c, and the penetrating hole 33i. Instead, it is possible to employ the configuration where the outer peripheral chamber 17 disposed on the upper side of the small chamber 15 communicates with the discharge passage 7 like the shock absorber D1, so as to simplify the passage shape.

In the shock absorbers D1 and D2, the pressure chambers 14, 25, and 36 are formed such that the free piston 5 is movable in the above-below direction. Instead, the pressure chambers 14, 25, and 36 may be formed such that the free piston 5 is movable not in the above-below direction but in the lateral direction or the oblique direction. In this case, the free piston 5 is less likely to be affected by vibration in the above-below direction to be input to the shock absorbers D1 and D2. In the case where the pressure chambers 14, 25, and 36 are formed such that the free piston 5 is movable in the above-below direction, it is possible to employ the large-sized free piston 5 so as to easily ensure the stroke amount of the free piston 5.

In the shock absorbers D1 and D2, the free piston 5 is movable inside the pressure chambers 14, 25, and 36. Accordingly, when being displaced to the stroke end, the free piston 5 might collide with the bottom member 11 so as to cause a hitting sound. Therefore, a fluid-pressure cushioning mechanism L may prevent the free piston 5 and the bottom member 11 from swiftly colliding with each other.

Figure 7:
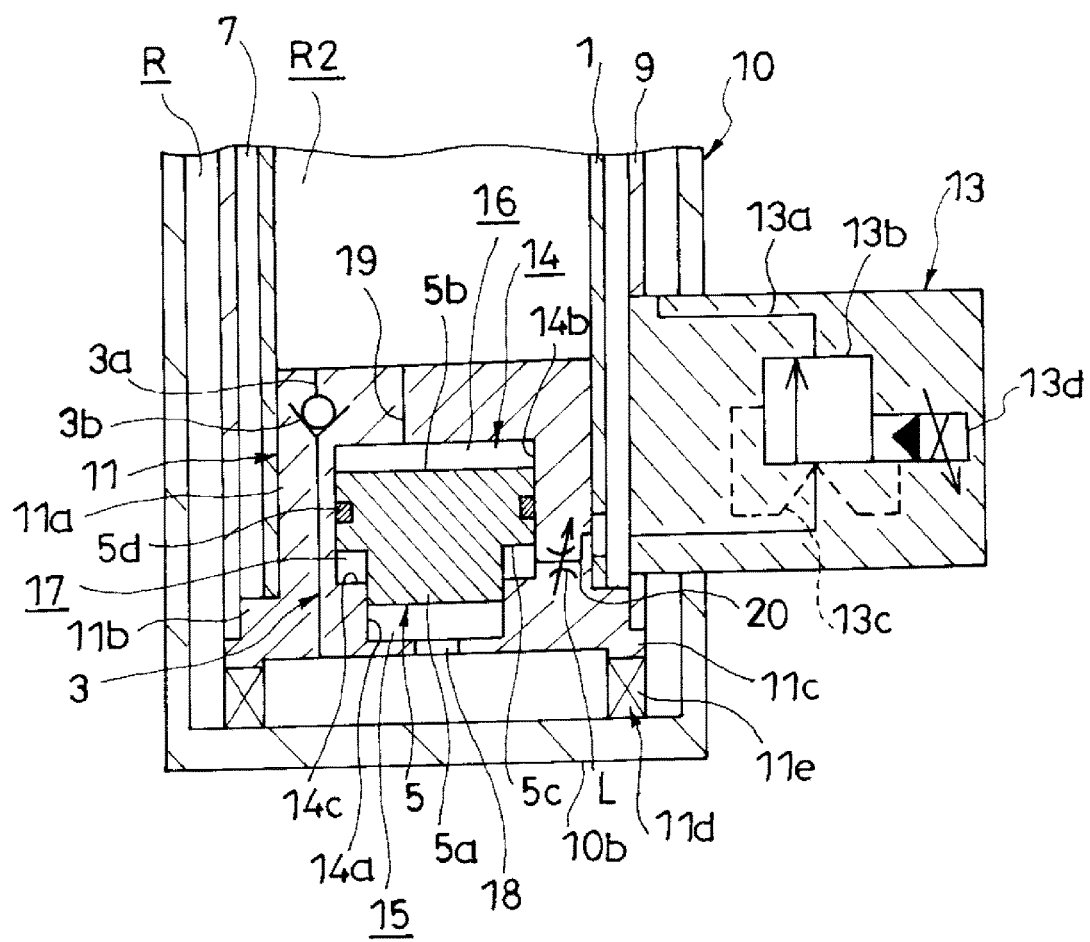
FIG. 7 is a partially enlarged vertical cross-sectional view of a shock absorber including a fluid-pressure cushioning mechanism.

As illustrated in FIG. 7, the fluid-pressure cushioning mechanism L when being disposed in the shock absorber D1 may be a variable throttle valve, whose flow passage area (flow passage cross-sectional area) changes corresponding to the displacement of the free piston 5, and may be disposed in the expansion side passage 20. In the variable throttle valve, which functions as the fluid-pressure cushioning mechanism L, it is possible to reduce the flow passage area as the free piston 5 is displaced from the center position. In the variable throttle valve, the lower limit may be set for the flow passage area and the flow passage area may be reduced to the lower limit or less. A predetermined amount as the displacement amount of the free piston 5 when the variable throttle valve starts to reduce its flow passage area can be set to any amount within the range where the free piston 5 does not reach the stroke end. The predetermined amount may be set to 0, and the variable throttle valve may reduce its flow passage area immediately when the free piston 5 is displaced from the center position even a little. The displacement amount of the free piston 5 when the variable throttle valve starts to reduce its flow passage area may be set to be different depending on the moving direction of the free piston 5.

Thus, the variable throttle valve as the fluid-pressure cushioning mechanism L is disposed. When the shock absorber D1 performs expansion and contraction operations and the free piston 5 is moved from the center position in the above-below direction so as to be displaced by the predetermined amount or more, the flow passage area of the variable throttle valve is reduced. Accordingly, the liquid from the inside of the outer peripheral chamber 17 is less likely to be discharged, so as to decelerate the moving speed of the free piston 5. This consequently allows blocking the swift collision between the free piston 5 and the bottom member 11 so as to reduce the hitting sound during a contact between both. In the shock absorber D1, the fluid-pressure cushioning mechanism L formed by the variable throttle valve may be disposed in the middle of the passage 18 or the pressure side passage 19. In the shock absorber D2, the fluid-pressure cushioning mechanism L formed by the variable throttle valve may be disposed in the middle of any passage of the expansion side passage 30, the pressure side passage 19, and the passage 31.

Figure 8:
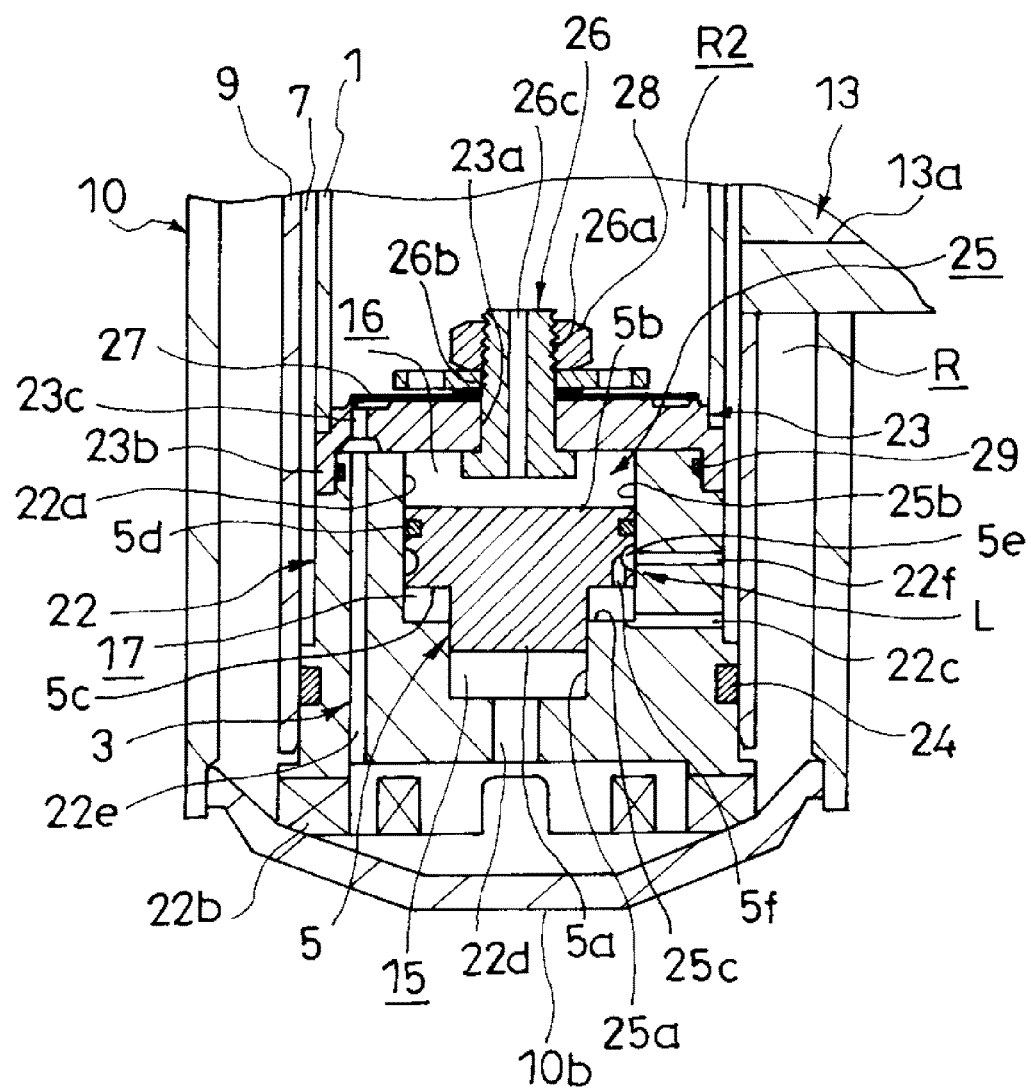
FIG. 8 is a vertical cross-sectional view of one example of a specific bottom member in a shock absorber according to an embodiment including a fluid-pressure cushioning mechanism.

FIG. 8 illustrates an example where the fluid-pressure cushioning mechanism L is disposed in the shock absorber D1. The fluid-pressure cushioning mechanism L includes a ring-shaped groove 5e, a hole 5f, and an orifice passage 22f. The ring-shaped groove 5e is disposed in the outer periphery of the large-piston portion 5b of the free piston 5. The hole 5f is opened in the stepped portion 5c and communicates with the ring-shaped groove 5e. The orifice passage 22f is disposed in the case member 22, and communicates between the discharge passage 7 and the large-cross-sectional-area portion 25b. When the free piston 5 is in the center position inside the pressure chamber 25, the ring-shaped groove 5e and the opening of the orifice passage 22f are positioned facing each other. When the free piston 5 is displaced from the center position in the above-below direction so as to be displaced from the center position by the predetermined amount or more, the overlap area between the ring-shaped groove 5e and the orifice passage 22f is reduced. When the ring-shaped groove 5e does not face the orifice passage 22f, the orifice passage 22f is obstructed by the large-piston portion 5b. Thus, the fluid-pressure cushioning mechanism L changes the flow passage area of the orifice passage 22f due to the displacement of the free piston 5. The free piston 5 and the case member 22 constitute the variable throttle valve as the fluid-pressure cushioning mechanism L. When the free piston 5 is displaced from the center position by the predetermined amount or more, the orifice passage 22f is obstructed to activate the through hole 22c alone and reduce the flow passage area of the passage communicating between the outer peripheral chamber 17 and the discharge passage 7 so as to decelerate the moving speed of the free piston 5 toward the stroke end side. This consequently allows blocking the swift collision between the free piston 5 and the bottom member 11 so as to reduce the hitting sound during a contact between both.

The fluid-pressure cushioning mechanism L is constituted by the free piston 5 and the case member 22 so as to dispose the variable throttle valve in the expansion side passage while ensuring a simple structure without increasing the number of components.

Figure 9:
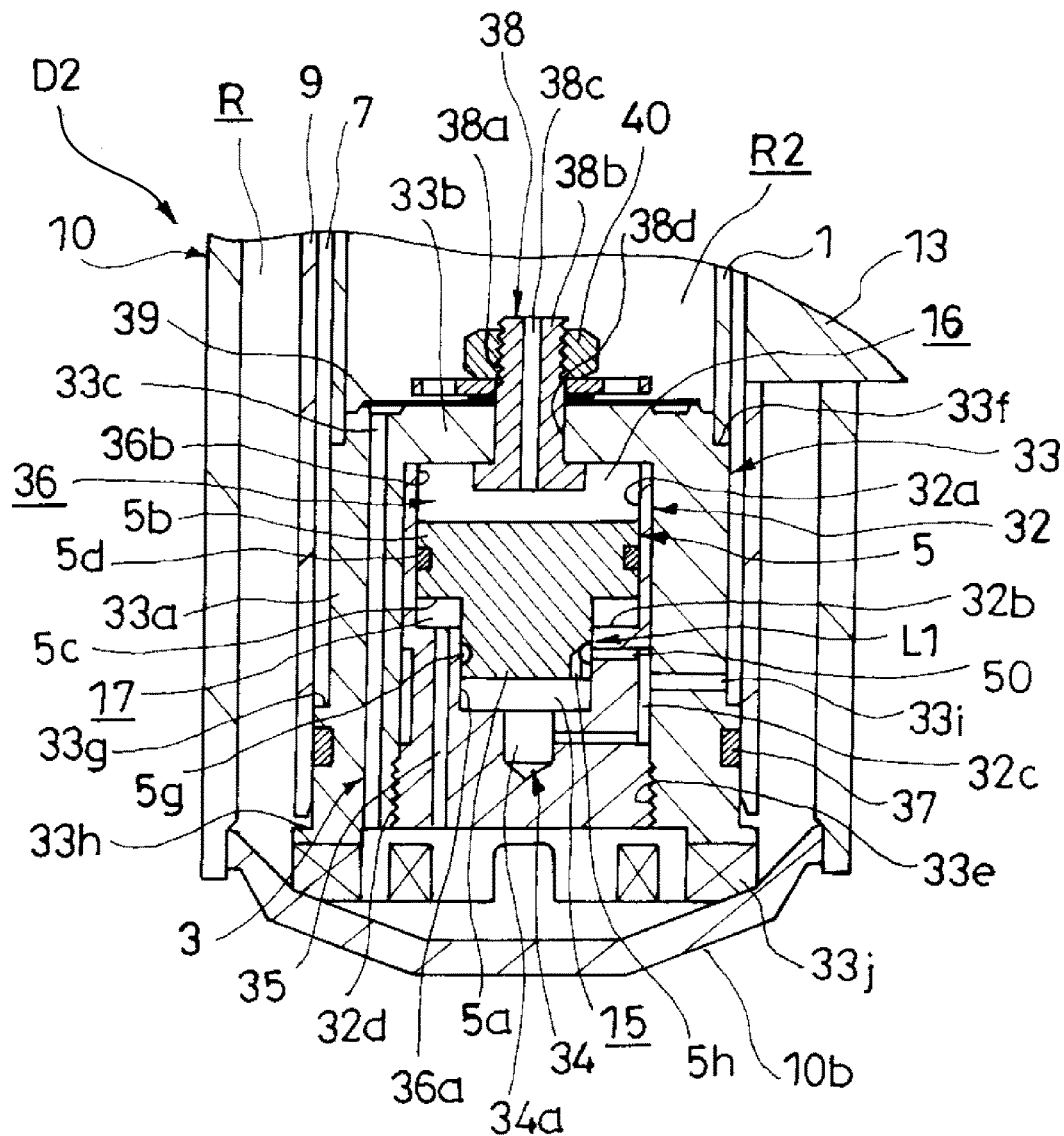
FIG. 9 is a vertical cross-sectional view of one example of a specific bottom member in a shock absorber according to another embodiment including a fluid-pressure cushioning mechanism.

FIG. 9 illustrates an example where the fluid-pressure cushioning mechanism L1 is disposed in the shock absorber D2. The fluid-pressure cushioning mechanism L1 is formed in the case member 32 separately from the expansion side passage 34, and includes an orifice passage 50, a ring-shaped groove 5g, and a hole 5h. The orifice passage 50 communicates between the discharge passage 7 and the small-cross-sectional-area portion 36a. The ring-shaped groove 5g is formed in the outer periphery of the small-piston portion 5b of the free piston 5. The hole 5h is formed in the small-piston portion 5b, and communicates between the small chamber 15 and the ring-shaped groove 5g. When the free piston 5 is in the center position inside the pressure chamber 36, the ring-shaped groove 5g and the opening of the orifice passage 50 are positioned facing each other. When the free piston 5 is displaced from the center position in the above-below direction so as to be displaced from the center position by the predetermined amount or more, the overlap area between the ring-shaped groove 5g and the orifice passage 50 is reduced. When the ring-shaped groove 5g does not face the orifice passage 50, the orifice passage 50 is obstructed by the small-piston portion 5a. Thus, the fluid-pressure cushioning mechanism L1 changes the flow passage area of the orifice passage 50 due to the displacement of the free piston 5. The free piston 5 and the case member 32 constitute the variable throttle valve as the fluid-pressure cushioning mechanism L1. When the free piston 5 is displaced from the center position by the predetermined amount or more, the orifice passage 50 is obstructed to activate the expansion side passage 34 alone and reduce the flow passage area of the passage communicating between the small chamber 15 and the discharge passage 7 so as to decelerate the moving speed of the free piston 5 toward the stroke end side. This consequently allows blocking the swift collision between the free piston 5 and the bottom member 11 so as to so as to reduce the hitting sound during a contact between both. When the fluid-pressure cushioning mechanisms L and L1 are disposed, the center position of the free piston 5 can be set to any position. It is also possible to set any amount as the displacement amount from the center position when the free piston 5 starts obstructing the orifice passages 22f and 50.

Figure 10:
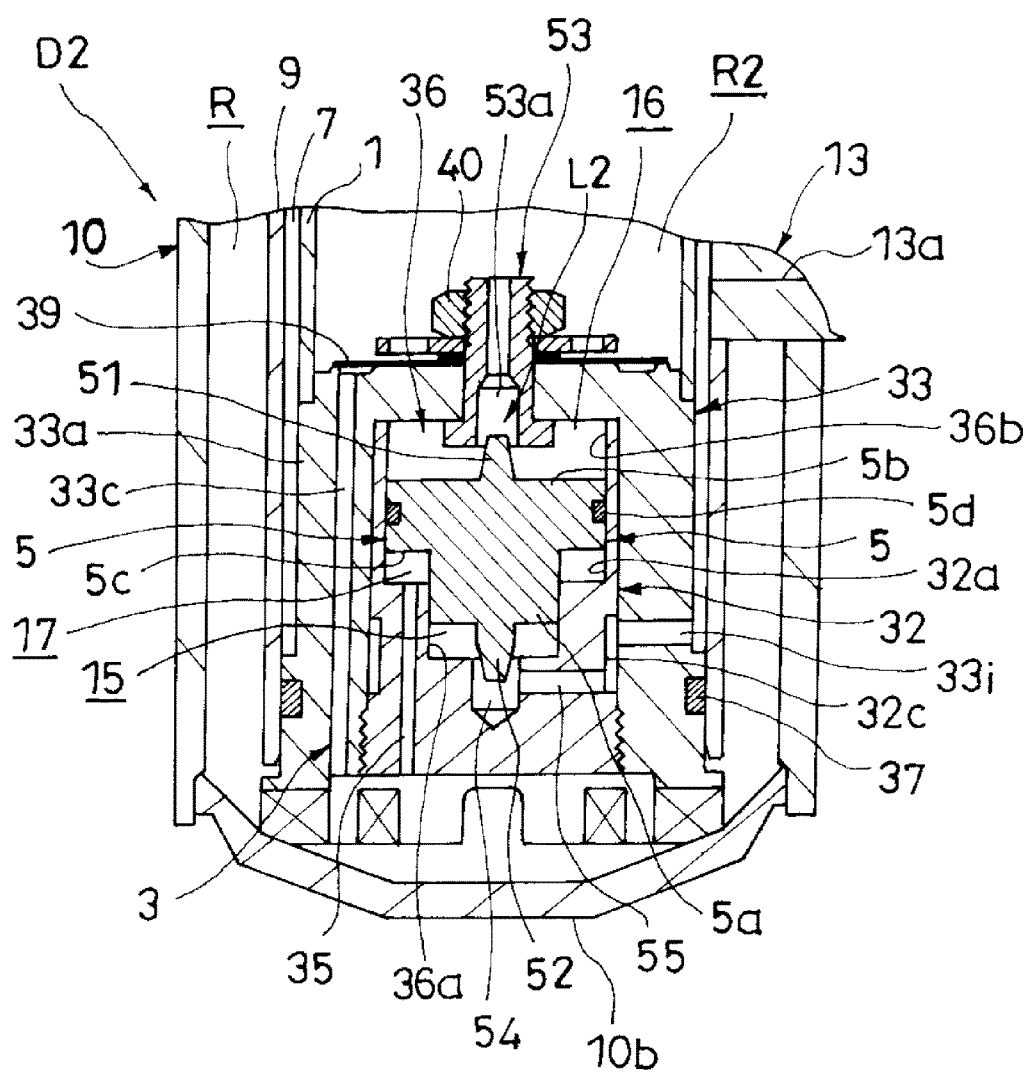
FIG. 10 is a vertical cross-sectional view of one example of a specific bottom member in a shock absorber according to another embodiment including a modification of the fluid-pressure cushioning mechanism.

As illustrated in FIG. 10, the shock absorber D2 can include a fluid-pressure cushioning mechanism L2 constituted of expansion-side-passage restricting means and pressure-side-passage restricting means. The large chamber 16 communicates with the pressure side chamber R2 through a passage 53a disposed in the bolt 53, and this passage 53a functions as the pressure side passage. The small chamber 15 communicates with the expansion side chamber R1 through: a vertical hole 54, which is opened in the lower end of the pressure chamber 36; a horizontal hole 55, which communicates with the vertical hole 54; and the ring-shaped groove 32c disposed in the outer periphery of the case member 32. In this case, the horizontal hole 55 does not include an orifice. The free piston 5 has the upper end including a rod-shaped pressure side plunger 51 and the lower end including a rod-shaped expansion side plunger 52. The pressure side plunger 51 and the expansion side plunger 52 may have truncated cone shapes whose cross-sectional areas are reduced toward the distal ends.

When the free piston 5 is displaced from the center position in the upward direction as the direction to compress the large chamber 16, the pressure side plunger 51 enters the inside of the passage 53a so as to reduce the flow passage area in the passage 53a as the pressure side passage. On the other hand, when the free piston 5 is displaced from the center position in the downward direction as the direction to compress the small chamber 15, the expansion side plunger 52 enters the inside of the vertical hole 54 so as to reduce the flow passage area in the expansion side passage. In this embodiment, the pressure-side-passage restricting means 51 is constituted of the pressure side plunger 51, and the expansion-side-passage restricting means is constituted of the expansion side plunger 52.

Reduction in flow passage area of the pressure side passage increases the resistance to the passage of liquid so as to decrease the moving speed of the free piston 5. Reduction in flow passage area of the expansion side passage increases the resistance to the passage of liquid so as to decrease the moving speed of the free piston 5. A first position of the free piston 5 when the pressure side plunger 51 starts entering the inside of the passage 53a can be set to any position by changing the length of the passage 53a or the pressure side plunger 51. A second position of the free piston 5 when the expansion side plunger 52 starts entering the inside of the vertical hole 54 can be set to any position by changing the length of the expansion side plunger 52. The distance from the center position of the free piston 5 to the first position may be different from the distance from the center position of the free piston 5 to the second position. Thus, also in the shock absorber D2 including a fluid-pressure cushioning mechanism L3, when the free piston 5 is displaced from the center position by the predetermined amount or more, the moving speed of the free piston 5 is decelerated. This consequently allows preventing the swift collision between the free piston 5 and the bottom member 11 as the housing. Then, this reduces the hitting sound due to a collision between the free piston 5 and the bottom member 11, so as not to provide uncomfortable feeling and anxious feeling to the vehicle occupant. Additionally, the free piston 5 does not suddenly stop so as not to cause the situation where the damping-force reduction effect disappears rapidly so as to suddenly change the damping force generated by the shock absorber D2. The fluid-pressure cushioning mechanism L2 can be constituted by any one of the pressure-side-passage restricting means and the expansion-side-passage restricting means. The fluid-pressure cushioning mechanism L2 can be used in combination with the above-described fluid-pressure cushioning mechanism L1.

Figure 11:
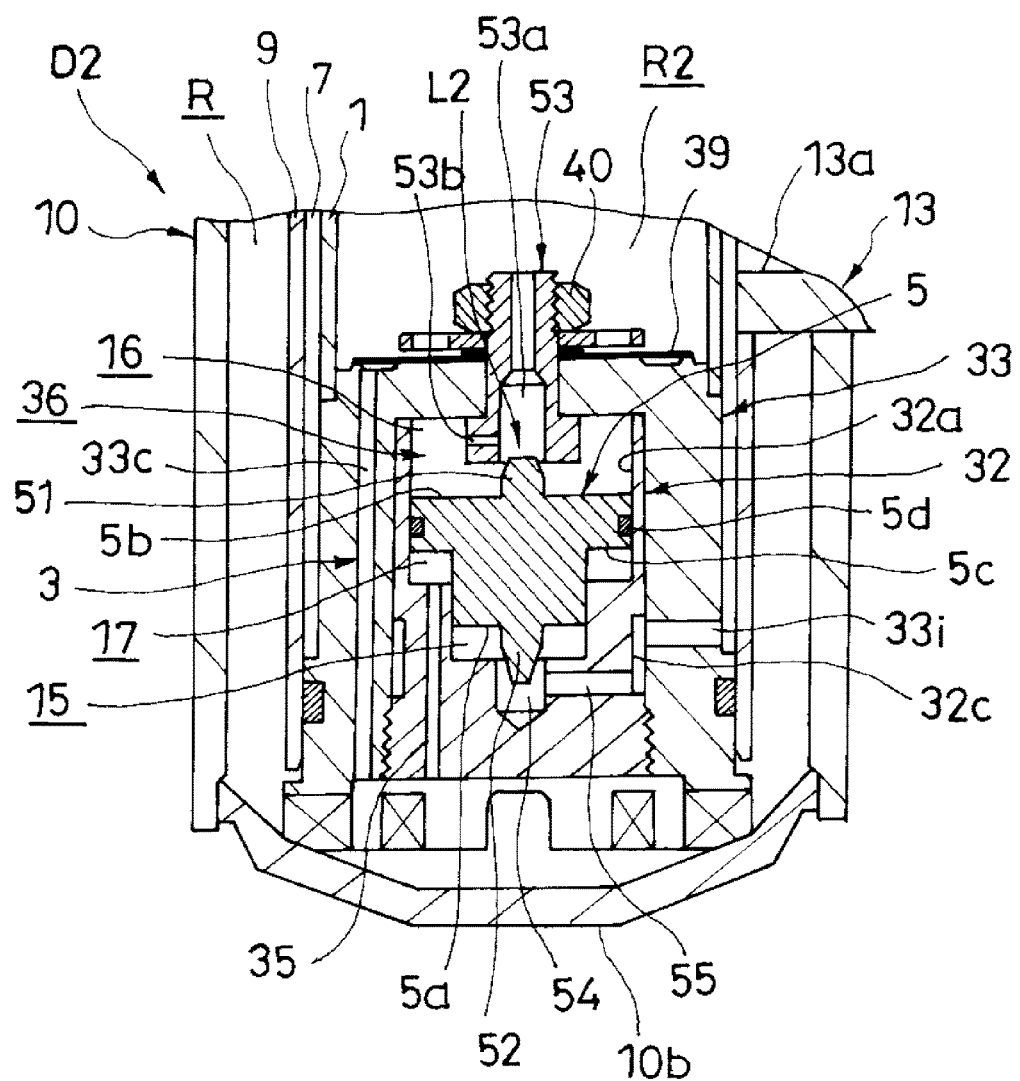
FIG. 11 is a vertical cross-sectional view of one example of a specific bottom member in a shock absorber according to another embodiment including another modification of the fluid-pressure cushioning mechanism.

As illustrated in FIG. 11, in the case where the pressure side plunger 51 is set to completely obstruct the opening end of the passage 53a, an orifice hole 53b communicating with the passage 53a from the side portion of the bolt 53 may be disposed.

Figure 12:
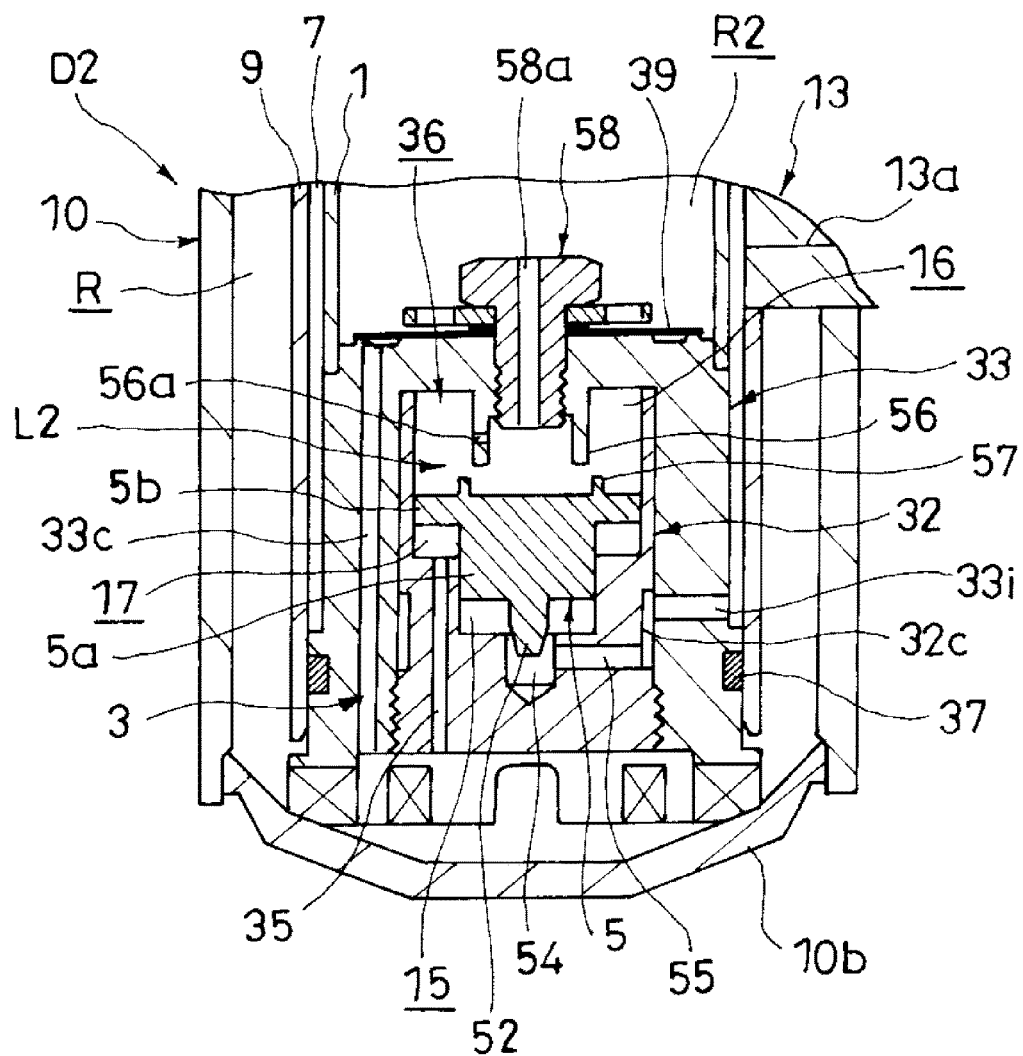
FIG. 12 is a vertical cross-sectional view of one example of a specific bottom member in a shock absorber according to another embodiment including another modification of the fluid-pressure cushioning mechanism.

In the shock absorber D2 illustrated in FIG. 12, instead of the pressure side plunger 51, the pressure-side-passage restricting means includes: a ring-shaped wall 56, which faces the large chamber 16 disposed in the lid member 33; and a ring-shaped protrusion 57, which is disposed in the upper end of the free piston 5. In the portion surrounded by the ring-shaped wall 56 in the lid member 33, a hollow bolt 58 including a passage 58a is screwed. The large chamber 16 and the pressure side chamber R2 communicate with each other through the passage 58a inside the hollow bolt 58. The passage 58a disposed in the hollow bolt 58 forms the pressure side passage. The ring-shaped wall 56 includes an orifice hole 56a formed to communicate between the outer peripheral side and the inner peripheral side of the ring-shaped wall 56. The inner diameter of the ring-shaped protrusion 57 is set to a size that allows the outer periphery of the ring-shaped wall 56 to enter the inside of the ring-shaped protrusion 57. The height of the ring-shaped protrusion 57 is set such that the orifice hole 56a is not obstructed by the ring-shaped protrusion 57 even when the ring-shaped wall 56 enters the inside of the ring-shaped protrusion 57 and the distal end of the ring-shaped wall 56 abuts on the free piston 5. When the free piston 5 is displaced from the center position in the upward direction as the direction to compress the large chamber 16, the ring-shaped wall 56 enters the inside of the ring-shaped protrusion 57 so as to reduce the flow passage area in the pressure side passage. Also in this case, when the free piston 5 is displaced from the center position by the predetermined amount or more, the resistance to the passage of liquid is increased so as to decelerate the moving speed of the free piston 5. This consequently allows preventing the swift collision between the free piston 5 and the bottom member 11 as the housing. Then, this reduces the hitting sound due to a collision between the free piston 5 and the bottom member 11. The position of the free piston 5 when the ring-shaped wall 56 starts entering the inside of the ring-shaped protrusion 57 can be set to any position by changing the height of the ring-shaped wall 56 or the ring-shaped protrusion 57.

Figure 13:
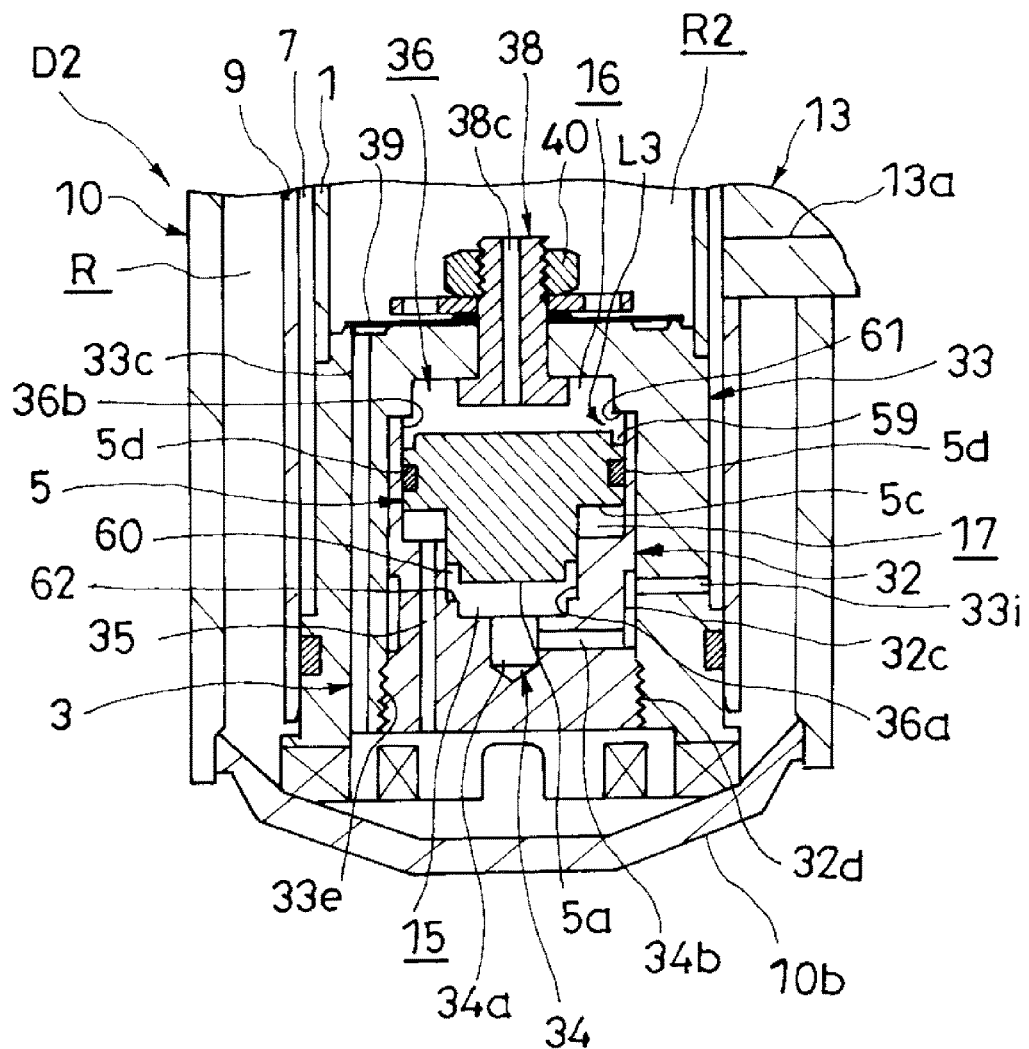
FIG. 13 is a vertical cross-sectional view of one example of a specific bottom member in the shock absorber according to the other embodiment including still another modification of the fluid-pressure cushioning mechanism.

The shock absorber D2 illustrated in FIG. 13 functions as the fluid-pressure cushioning mechanism L3, and includes a pressure-side cushioning chamber 59 and an expansion-side cushioning chamber 60. When the free piston 5 is displaced from the center position by the predetermined amount or more in the direction to compress the large chamber 16, the pressure-side cushioning chamber 59 is closed by the free piston 5 so as to restrict further displacement of the free piston 5. When the free piston 5 is displaced from the center position by the predetermined amount or more in the direction to compress the small chamber 15, the expansion-side cushioning chamber 60 is closed by the free piston 5 as to restrict further displacement of the free piston 5.

Specifically, the pressure-side cushioning chamber 59 is formed of: a ring-shaped depressed portion, which is disposed in the outer periphery of the upper end of the large-piston portion 5c in the free piston 5; and a ring-shaped protruding portion 61, which is disposed in the end portion facing the large chamber 16 in the lid member 33 and protrudes to the large chamber 16 side. The expansion-side cushioning chamber 60 is formed of: a ring-shaped depressed portion, which is disposed in the outer periphery of the lower end of the small-piston portion 5a in the free piston 5; and a ring-shaped protruding portion 62, which is disposed in the inner periphery of the lower end of the small-cross-sectional-area portion 36a in the hollow portion 32a of the case member 32.

The inner diameter of the ring-shaped protruding portion 61 is set to a diameter that can enter the inside of the ring-shaped depressed portion forming the pressure-side cushioning chamber 59. The inner diameter of the ring-shaped protruding portion 62 is set to a diameter that can enter the inside of the ring-shaped depressed portion forming the expansion-side cushioning chamber 60.

When the free piston 5 is displaced from the center position in the upward direction so as to be displaced by the predetermined amount or more, the ring-shaped protruding portion 61 enters the inside of the ring-shaped depressed portion forming the pressure-side cushioning chamber 59 so as to close the pressure-side cushioning chamber 59. Even when the free piston 5 starts moving further upward, the pressure inside the pressure-side cushioning chamber 59 increases so as to restrict the movement of the free piston 5. When the free piston 5 is displaced from the center position in the downward direction so as to be displaced by the predetermined amount or more, the ring-shaped protruding portion 62 enters the inside of the ring-shaped depressed portion forming the expansion-side cushioning chamber 60 so as to close the expansion-side cushioning chamber 60. Even when the free piston 5 starts moving further downward, the pressure inside the expansion-side cushioning chamber 60 increases so as to restrict the movement of the free piston 5. A third position of the free piston 5 when the ring-shaped protruding portion 61 starts entering the inside of the ring-shaped depressed portion forming the pressure-side cushioning chamber 59 can be set to any position by changing: the length of the ring-shaped depressed portion forming the pressure-side cushioning chamber 59; or the position and the length of the ring-shaped protruding portion 61. A fourth position of the free piston 5 when the ring-shaped protruding portion 62 starts entering the inside of the ring-shaped depressed portion forming the expansion-side cushioning chamber 60 can be set to any position by changing: the length of the ring-shaped depressed portion forming the expansion-side cushioning chamber 60; or the position and the length of the ring-shaped protruding portion 62. The distance from the center position of the free piston 5 to the third position may be different from the distance from the center position of the free piston 5 to the fourth position.

Also in the shock absorber D2 illustrated in FIG. 13, when the free piston 5 is displaced from the center position by the predetermined amount or more, the moving speed of the free piston 5 is decelerated. This consequently allows preventing the swift collision between the free piston 5 and the bottom member 11 as the housing. Then, this reduces the hitting sound due to a collision between the free piston 5 and the bottom member 11, so as not to provide uncomfortable feeling or anxious feeling to the vehicle occupant. Additionally, the free piston 5 does not suddenly stop so as not to cause the situation where the damping-force reduction effect disappears rapidly so as to suddenly change the damping force generated by the shock absorber D2. The fluid-pressure cushioning mechanism can be constituted by any one of the pressure-side cushioning chamber 59 and the pressure-side cushioning chamber 60. The fluid-pressure cushioning mechanism can be used in combination with the above-described fluid-pressure cushioning mechanisms L, L1, and L2.

The fluid-pressure cushioning mechanism is also applicable to the structure of the shock absorber D1. The expansion-side cushioning chamber 60 may be formed by: the ring-shaped depressed portion, which is disposed in the outer periphery of the lower end of the large-piston portion 5b in the free piston 5; and the ring-shaped protruding portion, which is disposed in the inner periphery of the lower end of the large-cross-sectional-area portion 25b or 36b in the pressure chamber 25 or 36. In this case, the expansion-side cushioning chamber 60 can be disposed inside the outer peripheral chamber 17. Furthermore, the expansion-side cushioning chamber 59 and the pressure-side cushioning chamber 60 may be formed in a structure other than the above-described structure. The pressure side cushion 59 only needs to be closed by the free piston 5 when the free piston 5 is displaced upward by the predetermined amount or more. The expansion-side cushioning chamber 60 only needs to be closed by the free piston 5 when the free piston 5 is displaced downward by the predetermined amount or more.

In the above-described embodiment, the cushioning mechanism using the fluid pressure reduces the hitting sound during a collision between the free piston 5 and the bottom member 11. However, instead of the above-described embodiment or in addition to the above-described embodiment, a cushioning member formed by an elastic body such as rubber may be disposed.

Figure 14:
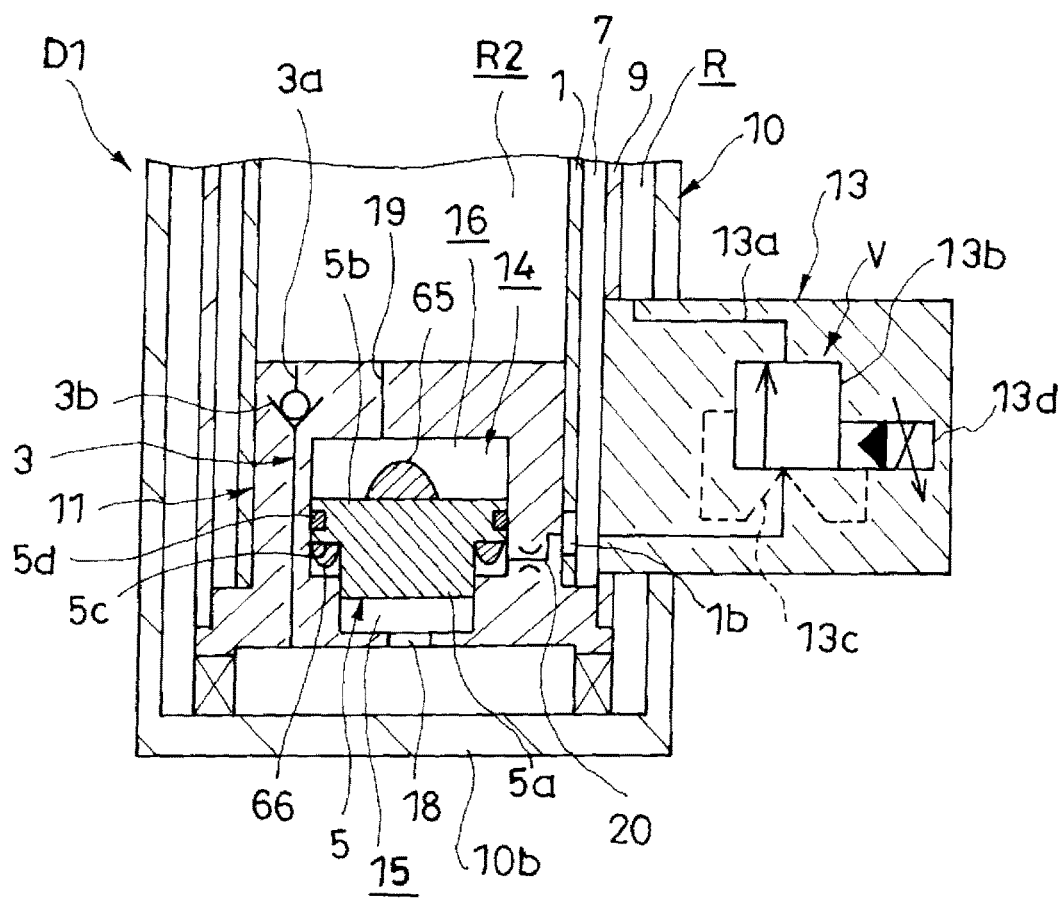
FIG. 14 is a vertical cross-sectional view of one example of a specific bottom member in a shock absorber according to an embodiment including a cushioning member.

Specifically, as illustrated in FIG. 14, a pressure side cushion 65 is disposed in the upper end, which is the side surface of the large chamber, of the free piston 5, and an expansion side cushion 66 facing the outer peripheral chamber 17 is disposed in the stepped portion 5c of the free piston 5. These pressure side cushion 65 and expansion side cushion 66 constitute the cushioning member. Accordingly, the free piston 5 and the bottom member 11 do not directly collide with each other, so as to allow reducing the hitting sound. The expansion side cushion 66 can also be disposed in the lower end of the small-piston portion 5a of the free piston 5. The pressure side cushion 65 and the expansion side cushion 66 may be both disposed on the bottom member 11 side. The pressure side cushion 65 and the expansion side cushion 66 are secured to the free piston 5 or the bottom member 11 by, for example, welding, fusing, or bonding.

Figure 15:
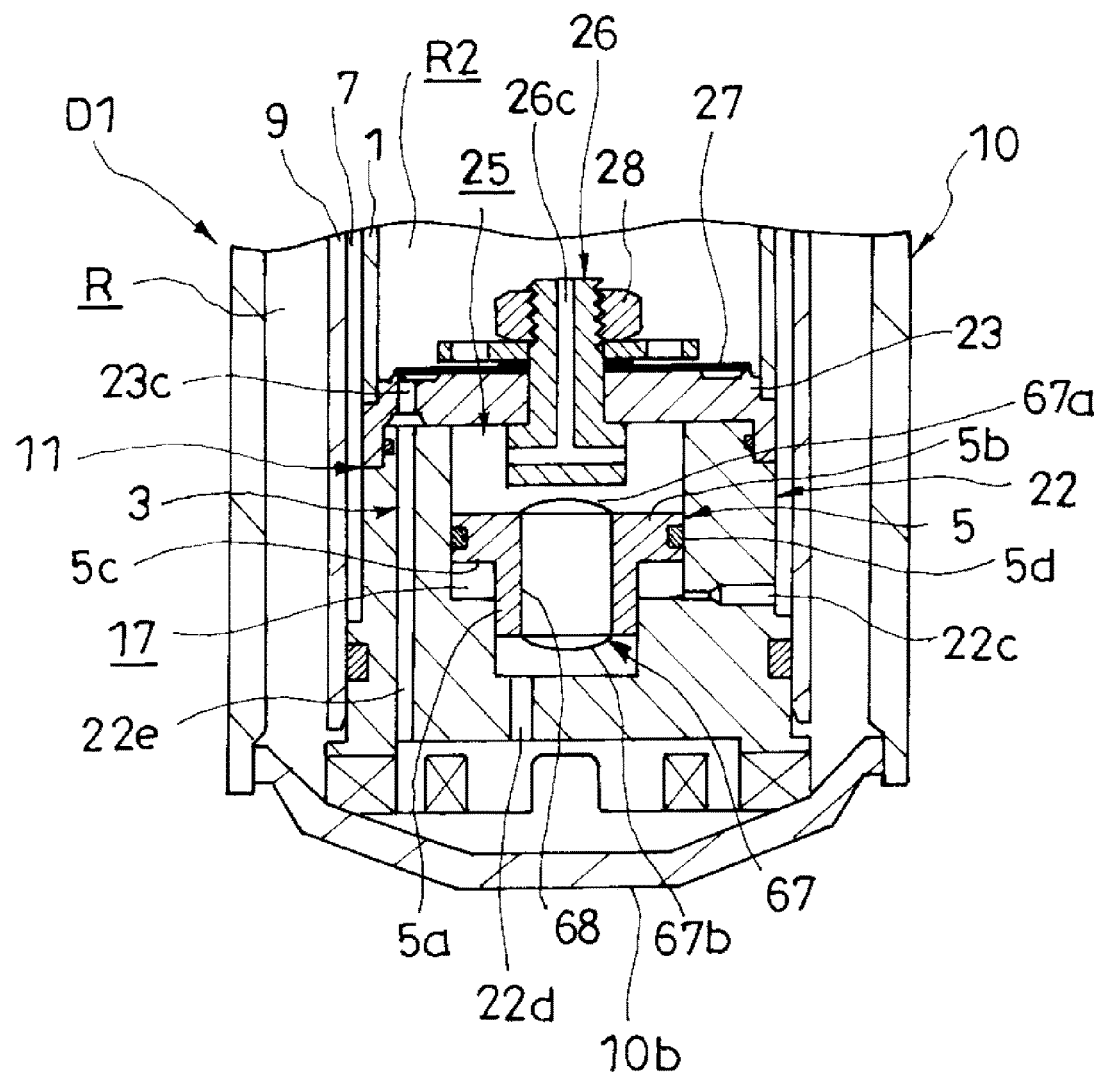
FIG. 15 is a vertical cross-sectional view of one example of a specific bottom member in a shock absorber according to an embodiment including a modification of the cushioning member.

As illustrated in FIG. 15, the cushioning member may be a cushion rubber 67 as a rubber member penetrating the free piston 5. Specifically, a holding hole 68, which penetrates the free piston 5 in the above-below direction, is disposed, and the cushion rubber 67 is inserted through this holding hole 68 to be secured. The method for securing the cushion rubber 67 to the holding hole 68 can employ various securing methods such as bonding, fusing, and press-fitting. An upper end 67a, which is the end on the large chamber side of the cushion rubber 67, has a hemispherical shape and protrudes to the large chamber 16 side, so as to constitute the pressure side cushion. A lower end 67b, which is the end on the small chamber side of the cushion rubber 67, has a hemispherical shape and protrudes to the small chamber 15 side, so as to constitute the expansion side cushion. Also in the case where the cushion rubber 67 constitutes the cushioning member, when the free piston 5 is displaced to the position near the stroke end, the upper end 67a or the lower end 67b of the cushion rubber 67 collides with the bottom member 11 so as to restrict the displacement of the free piston 5. Accordingly, the shock absorber including the cushion rubber 67 also reduces the occurrence of the hitting sound between the free piston 5 and the bottom member 11. The cushion rubber 67 seals the holding hole 68, and thus the small chamber 15 and the large chamber 16 do not communicate with each other even when the holding hole 68 penetrates the free piston 5. Accordingly, it is not necessary to additionally dispose a sealing member. Additionally, the installation of the cushioning member requires the small number of components and less assembly man-hours, and thus the installation cost is low.

Figure 16:
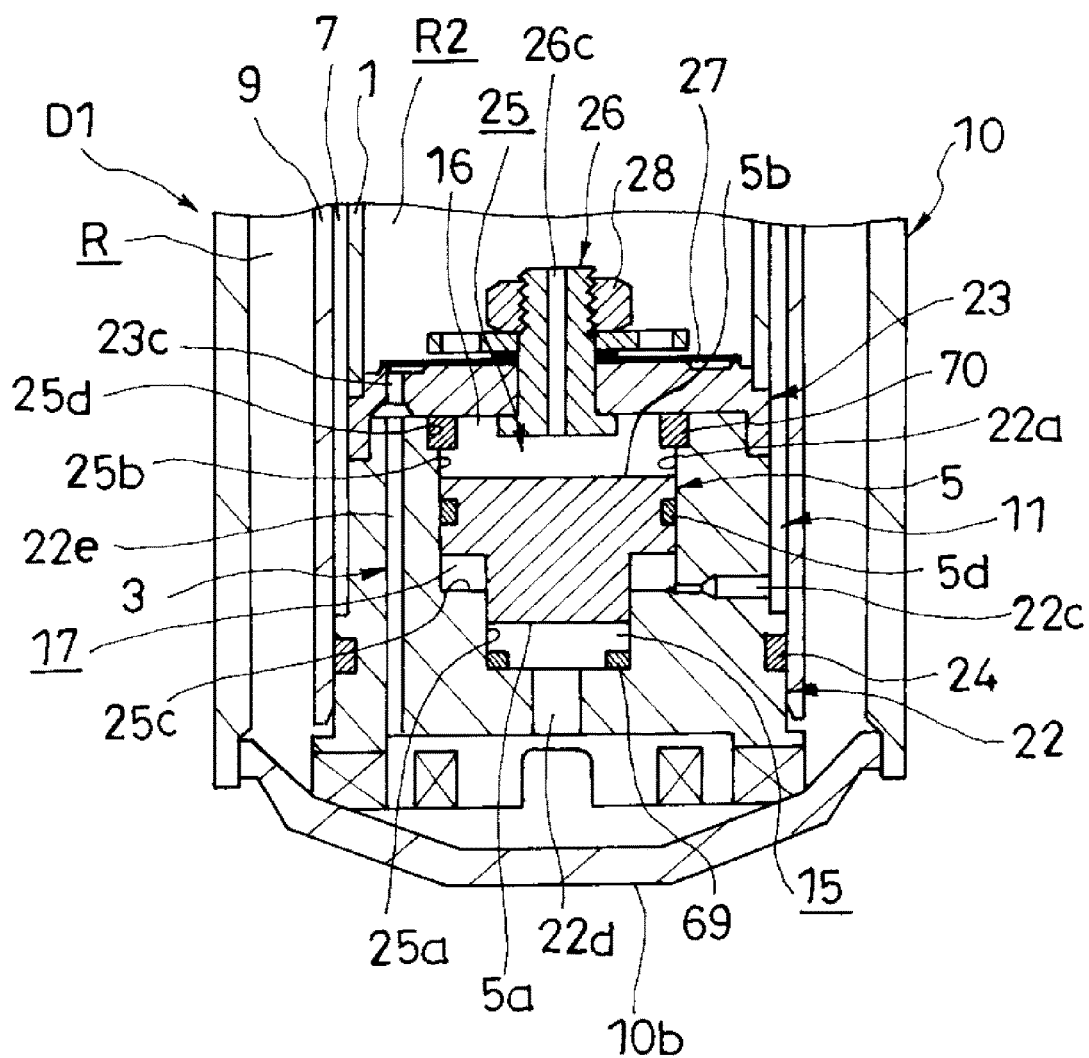
FIG. 16 is a vertical cross-sectional view of one example of a specific bottom member in a shock absorber according to an embodiment including another modification of the fluid-pressure cushioning mechanism.

As illustrated in FIG. 16, a cushioning member formed of an expansion side cushion 69 and a pressure side cushion 70 may be disposed in the bottom member 11. Specifically, the expansion side cushion 69 is a ring-shaped elastic body that is laminated on the top surface of the bottom portion of the hollow portion 22a in the case member 22, fits the inner periphery of the lower end of the small-cross-sectional-area portion 25a, and is disposed facing the small-piston portion 5a of the free piston 5. The pressure side cushion 70 is a ring-shaped elastic body that fits the inside of a ring-shaped depressed portion 25d, which is disposed in the opening end of the hollow portion 22a in the case member 22, and is disposed facing the top end surface of the large-piston portion 5b of the free piston 5.

The expansion side cushion 69 and the pressure side cushion 70 may be elastic bodies formed in ring shapes by resin or synthetic resin such as rubber, or may be wave washers. Alternatively, any one of the expansion side cushion 69 and the pressure side cushion 70 may be a wave washer while the other is an elastic body formed in a ring shape by resin or synthetic resin such as rubber. The expansion side cushion 69 and the pressure side cushion 70 can have any cross-sectional shape, and can employ various shapes other than a square ring and an O-ring. Collision of the free piston 5 with the expansion side cushion 69 and the pressure side cushion 70 restricts the movement of the free piston 5. When the cushioning member is compressed by the movement of the free piston 5 to the stroke end side, the cushioning member causes the repulsion force corresponding to the compression amount so as to gradually reduce the speed of the free piston 5. This consequently prevents the collision between: the free piston 5; and the case member 22 or the lid member 23. Accordingly, the shock absorber D1 including the expansion side cushion 69 and the pressure side cushion 70 also allows reducing the collision between the free piston 5 and the bottom member 11 so as to reduce the occurrence of the hitting sound between both. Accordingly, this allows preventing sudden change in damping force, so as to improve the ride comfort in the vehicle. The respective cushioning members are also applicable to the shock absorber D2.

Figure 17:
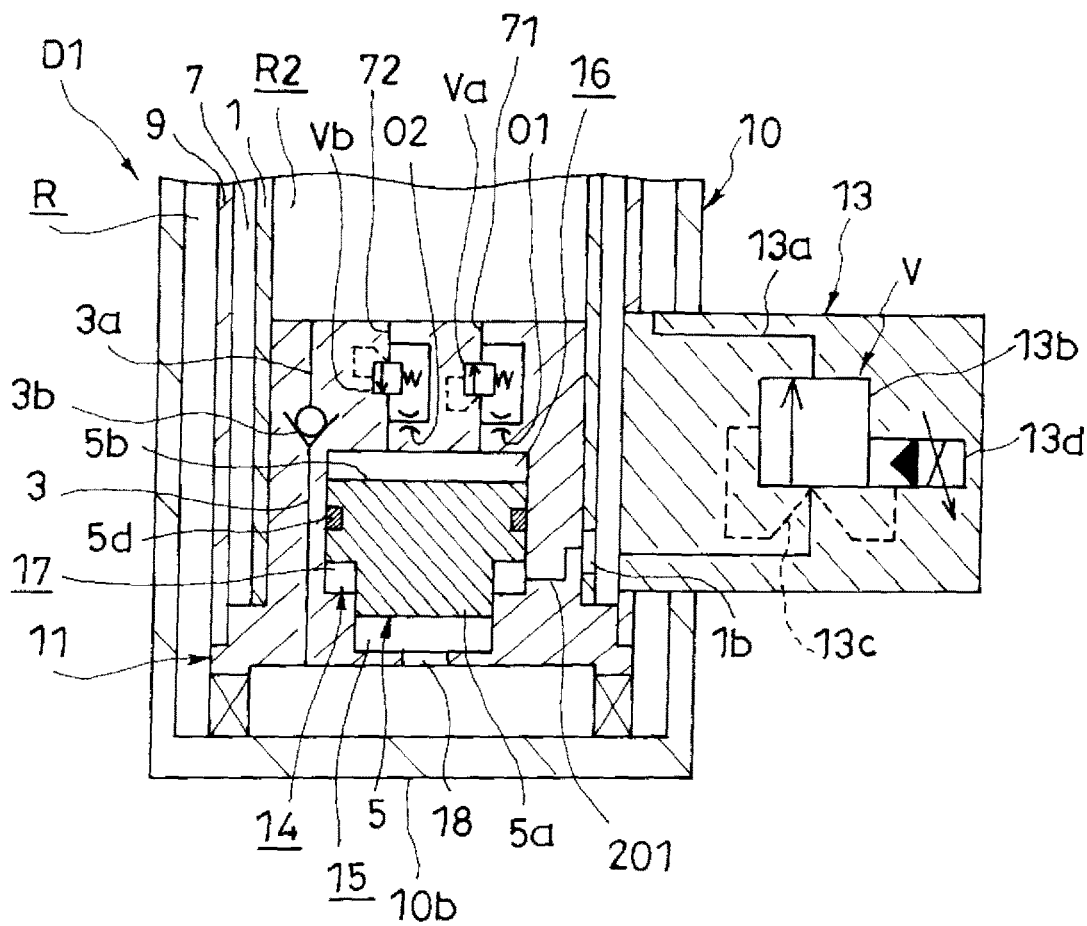
FIG. 17 is a vertical cross-sectional view of a bottom member in a shock absorber according to an embodiment including a pressure-side first passage and a pressure-side second passage.

While in the shock absorbers D1 and D2 the large chamber 16 and the pressure side chamber R2 are communicate with each other through the single pressure side passage 19, as illustrated in FIG. 17, a plurality of pressure side passages may be disposed. The shock absorber D1 illustrated in FIG. 17 includes a pressure-side first passage 71, a pressure-side second passage 72, a first valve Va, and a second valve Vb. The first valve Va is disposed in the pressure-side first passage 71, and allows only the flow of liquid from the large chamber 16 toward the pressure side chamber R2 and provides resistance to the flow. The second valve Vb is disposed in the pressure-side second passage 72, and allows only the flow of liquid from the pressure side chamber R2 toward the large chamber 16 and provides resistance to the flow.

The first valve Va maintains a valve closed state with respect to the flow of liquid from the pressure side chamber R2 toward the large chamber 16. An orifice O1 is disposed parallel to the first valve Va. The second valve Vb maintains a valve closed state with respect to the flow of liquid from the large chamber 16 toward the pressure side chamber R2. An orifice O2 is disposed parallel to the second valve Vb. Similarly to the shock absorbers D1 and D2, the pressure derived from the pressure side chamber R2 acts on the large chamber 16, and the large chamber 16 functions as a pressure-side pressure chamber communicating with the pressure side chamber R2.

In the case where the shock absorber D1 performs an expansion operation, when the free piston 5 is pressed upward by the pressure increase inside the outer peripheral chamber 17, the first valve Va opens so as to communicate between the large chamber 16 and the pressure side chamber R2. At this time, the pressure inside the large chamber 16 becomes higher than the pressure inside the pressure side chamber R2 by the amount corresponding to the pressure loss in the first valve Va with reference to the pressure of the pressure side chamber R2. Accordingly, in the case where the shock absorber D1 performs an expansion operation, a pressure higher than the pressure of the reservoir R by the amount corresponding to the pressure loss of the first valve Va acts on the top surface (the pressure-side pressure-receiving area A1) of the large-piston portion 5b of the free piston 5, a pressure approximately equal to the pressure of the reservoir R acts on the inferior surface (the pressure-receiving area C1) of the small-piston portion 5a. In this case, a high pressure derived from the expansion side chamber R1 acts on the stepped portion 5c (the expansion-side pressure-receiving area B1). Accordingly, the free piston 5 is moved by being pressed upward. When the free piston 5 moves, liquid flows into the outer peripheral chamber 17 corresponding to the movement amount of the free piston 5 and liquid is discharged from the large chamber 16 to the pressure side chamber R2. Accordingly, the pressure chamber 14 functions as an apparent flow passage, and the liquid moves from the expansion side chamber R1 to the pressure side chamber R2 while bypassing the damping force variable valve V. When the moving speed of the free piston 5 becomes high, the first valve Va correspondingly widely opens the pressure-side first passage 71. Accordingly, compared with the case where the large chamber 16 and the pressure side chamber R2 communicate with each other by the orifices O1 and O2 alone, the degree of the pressure increase inside the large chamber 16 with respect to the moving speed of the free piston 5 becomes low.

On the other hand, in the case where the shock absorber D1 performs a contraction operation, the outer peripheral chamber 17 communicates with the expansion side chamber R1 via the expansion side passage 201, and the pressure derived from the expansion side chamber R1 acts inside the outer peripheral chamber 17. The small chamber 15 communicates with the reservoir R, and thus the inside of the small chamber 15 has a pressure approximately equal to that inside the reservoir R. On the other hand, the large chamber 16 communicates with the pressure side chamber R2 through the pressure-side second passage 72 where the second valve Vb is disposed. The pressure increase inside the pressure side chamber R2 causes the second valve Vb to open so as to communicate between the large chamber 16 and the pressure side chamber R2. Accordingly, in this case, the pressure inside the large chamber 16 becomes lower than the pressure inside the pressure side chamber R2 by the amount corresponding to the pressure loss in the second valve Vb with reference to the pressure of the pressure side chamber R2. Accordingly, in the case where this shock absorber D1 performs a contraction operation, a pressure lower than the pressure of the pressure side chamber R2 by the amount corresponding to the pressure loss of the second valve Vb acts on the top surface (the pressure-side pressure-receiving area A1) of the large-piston portion 5b of the free piston 5. In this case, a pressure approximately equal to the pressure of the expansion side chamber R1 acts on the stepped portion 5c (the expansion-side pressure-receiving area B1), and the pressure of the reservoir R acts on the inferior surface (the pressure-receiving area C1) of the small-piston portion 5a. The area (the pressure-side pressure-receiving area A1) of the top surface of the large-piston portion 5b is larger than the area (the expansion-side pressure-receiving area B1) of the stepped portion 5c. The pressure loss of the second valve Vb is set such that the value of the product of the pressure inside the large chamber 16 during the contraction operation of the shock absorber D1 and the pressure-side pressure-receiving area A1 becomes larger than the value of the product of the pressure of the outer peripheral chamber 17 and the expansion-side pressure-receiving area B1. Accordingly, the free piston 5 is pressed to move to the lower side. When the free piston 5 moves, liquid is discharged from the outer peripheral chamber 17 to the discharge passage 7, but liquid flows into the large chamber 16 from the pressure side chamber R2 and liquid is discharged to the reservoir R from the small chamber 15. In this case, the liquid in the amount obtained by subtracting the volume reduction amount of the outer peripheral chamber 17 from the volume expansion amount of the large chamber 16 moves from the inside of the cylinder 1 to the reservoir R. That is, the pressure chamber 14 functions as the apparent flow passage, and the liquid discharged from the small chamber 15 moves from the inside of the cylinder 1 to the reservoir R while bypassing the damping force variable valve V. When the moving speed of the free piston 5 becomes high, the second valve Vb correspondingly widely opens the pressure-side second passage 72. Accordingly, compared with the case where the large chamber 16 and the pressure side chamber R2 communicate with each other by the orifices O2 and O2 alone, the degree of pressure decrease inside the large chamber 16 with respect to the moving speed of the free piston 5 becomes low.

Figure 18:
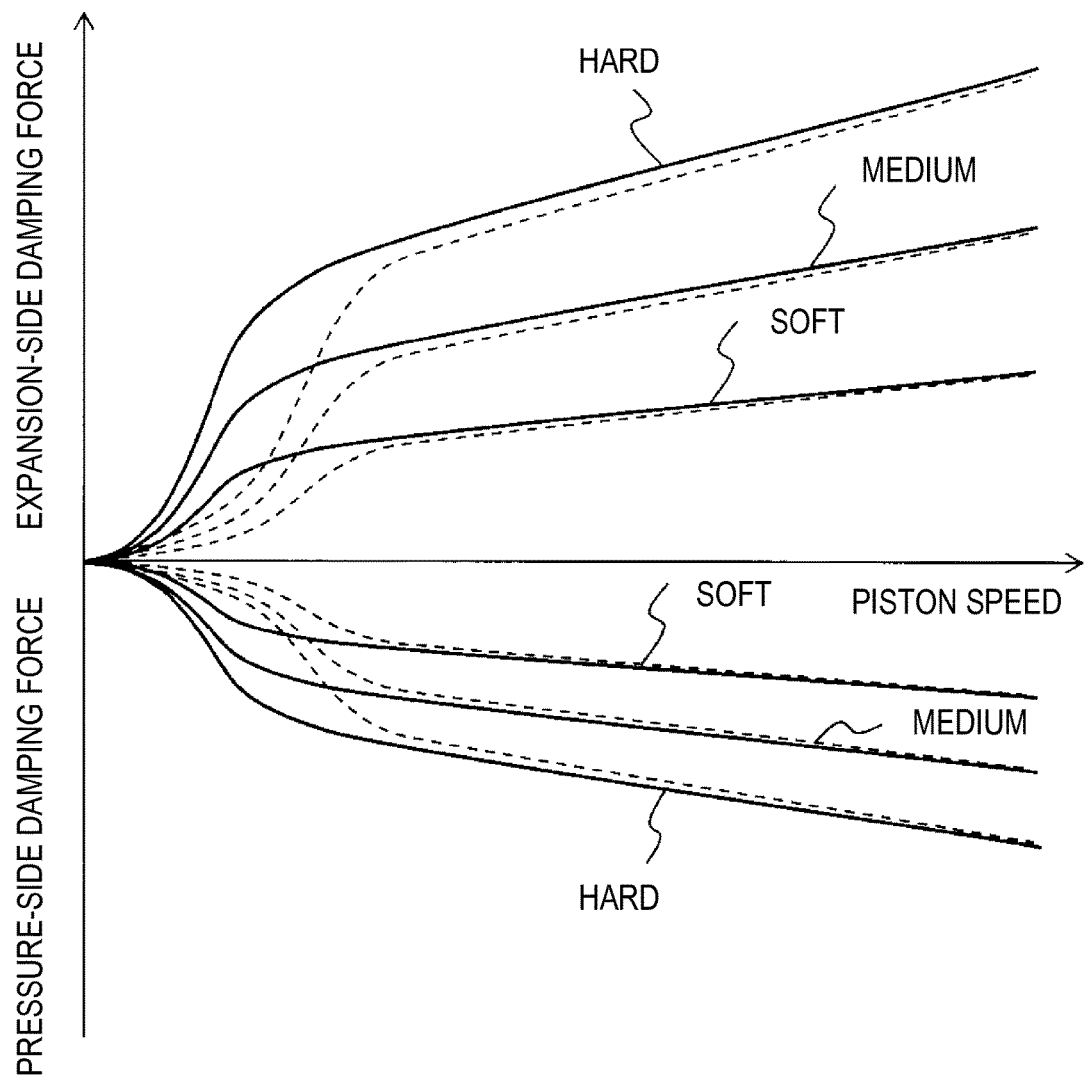
FIG. 18 is an attenuation characteristic diagram of the shock absorber according to the embodiment including the pressure-side first passage and the pressure-side second passage.

Even when the stretching speed of the shock absorber D1 becomes high and thus the flow rate of liquid exchanged between the large chamber 16 and the pressure side chamber R2 increases, the first valve Va and the second valve Vb correspondingly widely open the pressure-side first passage 71 and the pressure-side second passage 72. Therefore, the free piston 5 does not have difficulty in movement compared with the configuration where the large chamber 16 and the pressure side chamber R2 communicate with each other by the orifices alone. Accordingly, the effect of a damping-force reduction is provided also when the stretching speed of the shock absorber D1 reaches a high speed range. Specifically, the attenuation characteristic of the shock absorber D1 is illustrated in FIG. 18. The respective solid lines in FIG. 18 denote attenuation characteristics in the case where the damping forces on the expansion side and the pressure side of the shock absorber D1 are set to be soft, medium, and hard by the damping force variable valve V as the damping force adjusting unit. The dashed lines denote the characteristics of the damping forces in the case where a high frequency vibration is input to the shock absorber D1 so as to reduce the damping force under the conditions where the soft, medium, and hard attenuation characteristics are set.

Accordingly, in the shock absorber D1 illustrated in FIG. 17, even when the stretching speed becomes high and thus the flow rate of the liquid exchanged between the large chamber 16 and the pressure side chamber R2 increases, the first valve Va and the second valve Vb correspondingly widely open the pressure-side first passage 71 and the pressure-side second passage 72. Accordingly, a damping-force reduction effect is provided also when the stretching speed of the shock absorber D1 reaches a high speed range.

Figure 19:
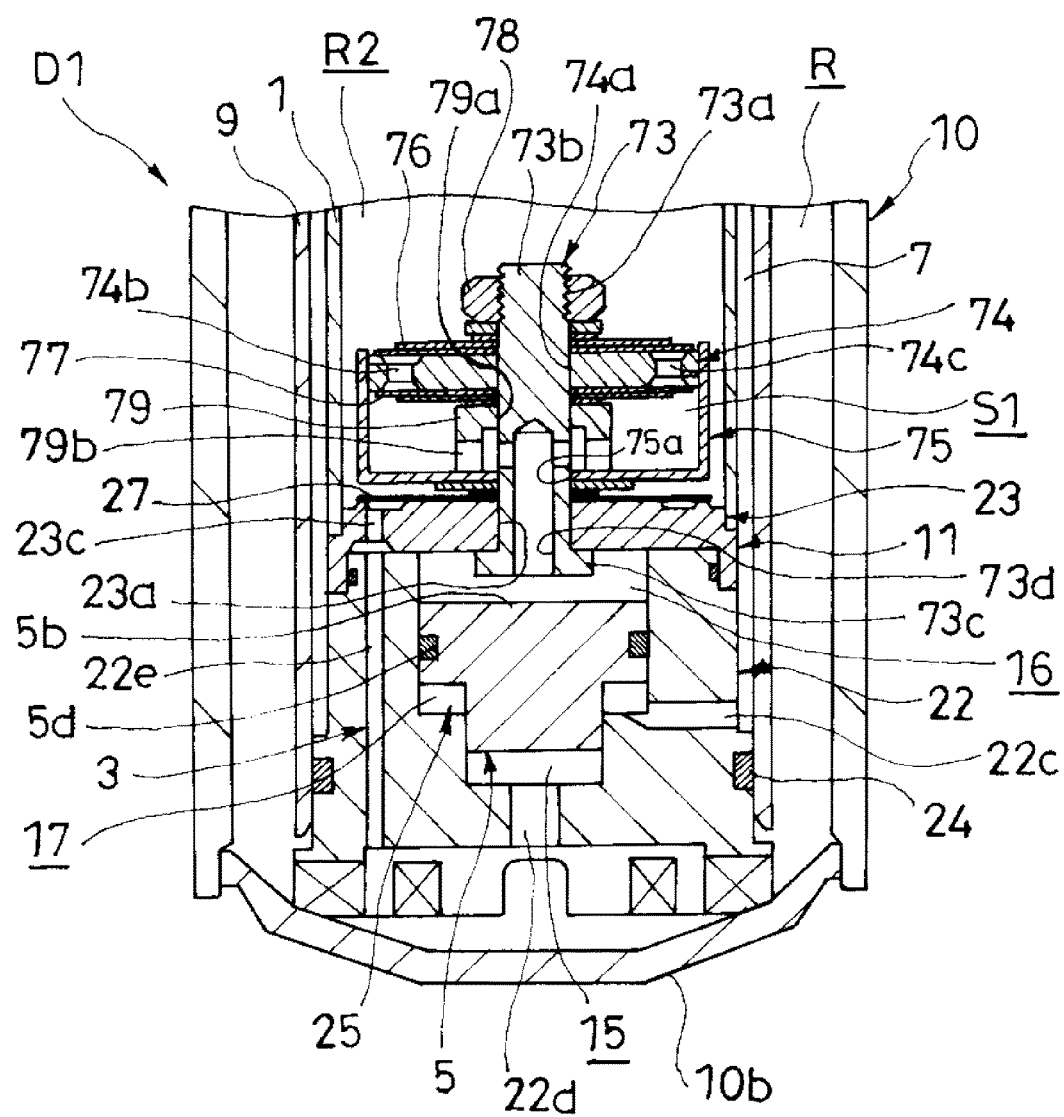
FIG. 19 is a vertical cross-sectional view of a specific bottom member of a shock absorber according to an embodiment including a modification of the pressure-side first passage and the pressure-side second passage.

In the shock absorber D1 illustrated in FIG. 17, the bottom member 11 is schematically illustrated. For example, as illustrated in FIG. 19, the bottom member 11 includes a case member 22, a lid member 23, a valve disc 74, and a cap 75. The case member 22 includes a hollow portion 22a into which the free piston 5 is inserted. The lid member 23 obstructs the hollow portion 22a of the case member 22. The valve disc 74 couples to the lid member 23 via a coupling rod 73, and is disposed inside a pressure side chamber R2. The cap 75 is mounted on the outer periphery of the coupling rod 73 and fits the valve disc 74 so as to define a room S1 inside the pressure side chamber R2. The valve disc 74 includes a first valve 76 and a second valve 77, which are formed by leaf valves.

The coupling rod 73 is inserted through the bolt insertion hole 23a of the lid member 23. The coupling rod 73 includes a shaft portion 73b, whose distal end includes a threaded portion 73a, and a head 73c, which is formed in the base end of the shaft portion 73b. On the outer periphery of the shaft portion 73b of the coupling rod 73, a disk-shaped check valve 27, which is placed on the top surface of the lid member 23, is mounted. The check valve 27 is secured to the lid member 23 by the coupling rod 73 and a nut 78, which is screwed to the threaded portion 73a, and opens and closes the port 23c formed in the lid member 23. The coupling rod 73 internally includes a rod internal passage 73d, which is opened in the lower end of the head 73c and communicates with the side portion of the shaft portion 73b.

In the outer periphery of the shaft portion 73b of the coupling rod 73, over the check valve 27, the cap 75 in a bottomed cylindrical shape, a pipe-shaped spacer 79, the second valve 77, the valve disc 74, and the first valve 76 are assembled in this order. These members are sandwiched by the nut 78 and the head 73c in the coupling rod 73 so as to be secured to the lid member 23.

The cap 75 includes a hole 75a, which has a bottomed cylindrical shape and has a bottom portion through which the shaft portion 73b of the coupling rod 73 is inserted. The spacer 79 of a topped cylindrical shape includes a top portion having a hole 79a, through which the shaft portion 73b of the coupling rod 73 is inserted; and a pipe portion having a communication hole 79b, which communicates between the inside and outside of the pipe portion. The valve disc 74 includes the center having a hole 74a, through which the shaft portion 73b of the coupling rod 73 is inserted; and a peripheral edge having a first port 74b and a second port 74c, which are opened from the upper ends to the lower ends.

When the valve disc 74 is assembled in the shaft portion 73b across the spacer 79, the outer periphery of the valve disc 74 fits the inner periphery of the pipe portion of the cap 75. Accordingly, inside the cap 75, the room S1 is defined separately from the pressure side chamber R2. The room S1 communicates with the pressure side chamber R2 through the first port 74b and the second port 74c. One end of the rod internal passage 73d disposed inside the coupling rod 73 is opened in the side portion of the shaft portion 73b positioned inside the pipe portion of the spacer 79, and the other end is opened in the lower end of the head 73c positioned inside the large chamber 16. The inside of the pipe portion of the spacer 79 communicates with the room S1 through the communication hole 79b. Accordingly, the large chamber 16 communicates with the pressure side chamber R2 through the rod internal passage 73d, the inside of the spacer 79, the communication hole 79b, the room S1, the first port 74b, and the second port 74c.

The first valve 76 laminated on the surface on the pressure side chamber R2 side of the valve disc 74 is a laminated leaf valve where ring-shaped plates are laminated, and opens and closes the upper-end opening end of the first port 74b. The first valve 76 is a one-way passage that allows only the flow of liquid from the large chamber 16 toward the pressure side chamber R2 via the first port 74b, and provides resistance to the flow of the passing liquid.

The second valve 77 laminated on the surface on the room S1 side of the valve disc 74 is a laminated leaf valve where ring-shaped plates are laminated, and opens and closes the lower-end opening end of the second port 74c. The second valve 77 is a one-way passage that allows only the flow of liquid from the pressure side chamber R2 toward the large chamber 16 via the second port 74c, and provides resistance to the flow of the passing liquid. In the shock absorber D1 illustrated in FIG. 19, the pressure-side first passage is formed by the first port 74b and the rod internal passage 73d while the pressure-side second passage is formed by the second port 74c and the rod internal passage 73d. In the shock absorber D1 illustrated in FIG. 19, the respective members constituting the bottom member 11 are incorporated in the shock absorber D1 without difficulty.

Figure 20:
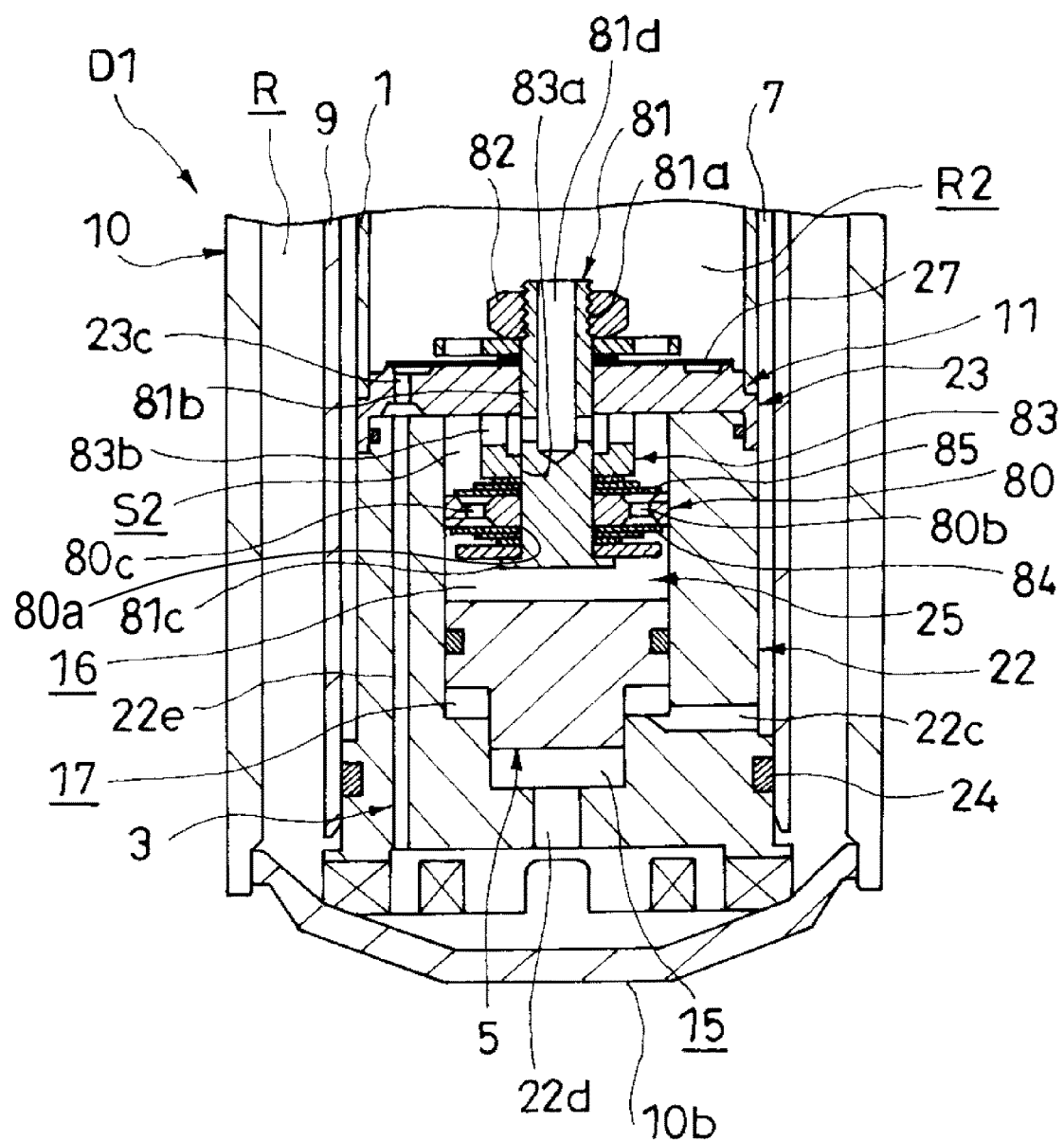
FIG. 20 is a vertical cross-sectional view of a specific bottom member of a shock absorber according to an embodiment including another modification of the pressure-side first passage and the pressure-side second passage.

Compared with the shock absorber D1 in FIG. 19, the shock absorber D1 illustrated in FIG. 20 houses a valve disc 80 in the case member 22. The valve disc 80 couples to the lid member 23 by a coupling rod 81, and is housed in the hollow portion 22a of the case member 22.

The coupling rod 81 includes: a shaft portion 81b having a distal end with a threaded portion 81a; a head 81c formed in the base end of the shaft portion 81b; and a rod internal passage 81d, which is opened in the upper end of the shaft portion 81b and communicates with the side portion of the shaft portion 81b. On the outer periphery of the shaft portion 81b of the coupling rod 81, the check valve 27 is mounted and laminated on the surface on the pressure side chamber R2 side of the lid member 23. The check valve 27 is secured to the lid member 23 by the coupling rod 81 and a nut 82, which is screwed to the threaded portion 81a, and opens and closes the port 23c.

In the outer periphery of the shaft portion 81b of the coupling rod 81, under the lid member 23, a pipe-shaped spacer 83, a first valve 85, the valve disc 80, and a second valve 84 are assembled. These are sandwiched by the nut 82 and the head 81c in the coupling rod 81 so as to be secured to the lid member 23.

The spacer 83 has a bottomed cylindrical shape, and includes: a hole 83a disposed in the bottom portion, through which the shaft portion 81b of the coupling rod 81 is inserted; and a communication hole 83b, which is disposed in the pipe portion to communicate between the inside and outside of the pipe portion. The valve disc 80 includes: a hole 80a disposed in the center, through which the shaft portion 81b of the coupling rod 81 is inserted; and a first port 80c and a second port 80b, which are opened from the upper ends to the lower ends.

The valve disc 80 is laminated on the lid member 23 via the spacer 83. When the valve disc 80 assembled in the shaft portion 81b is inserted into the hollow portion 22a, the outer periphery of the valve disc 80 fits the inner periphery of the hollow portion 22a of the case member 22. Accordingly, the hollow portion 22a is defined as the pressure chamber 25 and a room S2.

The inside of the pressure chamber 25 is defined as the small chamber 15, the large chamber 16, and the outer peripheral chamber 17 by insertion of the free piston 5. The small chamber 15 communicates with the reservoir R through the passage 22d disposed in the case member 22. The outer peripheral chamber 17 communicates with the discharge passage 7 through the through hole 22c. The through hole 22c, which is opened in the stepped portion 25c, is formed to keep the communication between the outer peripheral chamber 17 and the discharge passage 7 until the free piston 5 is completely brought into close contact with the stepped portion 25c.

The room S2 communicates with the large chamber 16 through the first port 80c and the second port 80b. One end of the rod internal passage 81d disposed in the coupling rod 81 is opened in the side portion of the shaft portion 81b positioned inside the pipe portion of the spacer 83, and the other end is opened in the distal end of the shaft portion 81b facing the pressure side chamber R2. The inside of the pipe portion of the spacer 83 communicates with the room S2 through the communication hole 83b. Accordingly, the large chamber 16 communicates with the pressure side chamber R2 through the rod internal passage 81d, the inside of the spacer 83, the communication hole 83b, the room S2, the first port 80c, and the second port 80b.

The second valve 84 laminated on the surface on the large chamber 16 side of the valve disc 80 is a laminated leaf valve where ring-shaped plates are laminated, and opens and closes the lower opening end of the second port 80b. The second valve 84 is one-way passage that allows only the flow of liquid from the pressure side chamber R2 toward the large chamber 16 via the second port 80b, and provides resistance to the flow of the passing liquid.

The first valve 85 laminated on the surface on the pressure side chamber R2 side of the valve disc 80 is a laminated leaf valve where ring-shaped plates are laminated, and opens and closes the upper opening end of the first port 80c. The first valve 85 is a one-way passage that allows only the flow of liquid from the large chamber 16 toward the pressure side chamber R2 via the first port 80c, and provides resistance to the flow of the passing liquid.

In the shock absorber D1 illustrated in FIG. 20, the pressure-side first passage is formed by the first port 80c and the rod internal passage 81d while the pressure-side second passage is formed by the second port 80b and the rod internal passage 81d. In the shock absorber D1 illustrated in FIG. 20, the respective members constituting the bottom member 11 are incorporated in the shock absorber D1 without difficulty.

In the shock absorber D1 in FIG. 19, the pressure side chamber R2 internally houses the valve disc 74, the first valve 76, and the second valve 77. In the shock absorber D1 in FIG. 20, the bottom member 11 internally houses the valve disc 80, the first valve 85, and the second valve 84. Accordingly, compared with the shock absorber D1 in FIG. 20 where the bottom member 11 internally houses the valve disc 80, the shock absorber D1 in FIG. 19 where the pressure side chamber R2 internally houses the valve disc 74 can ensure a large outer diameter of the valve disc 74 and can also ensure large outer diameters of the first valve 76 and the second valve 77. The deflection rigidities of the first valve 76 and the second valve 77 can be lower than the deflection rigidities of the first valve 85 and the second valve 84. Accordingly, the pressure loss when the first valve 76 and the second valve 77 open is smaller than that when the first valve 85 and the second valve 84 open. Thus, the shock absorber D1 in FIG. 19 allows increasing the amount of reduction in damping-force reduction effect during input of a high-frequency vibration compared with the shock absorber D1 in FIG. 20.

This embodiment described above provides the following operation and effect.

With the shock absorber according to the present invention, the damping force adjusting unit allows adjusting the damping force with respect to a vibration in a relatively low frequency band so as to damp the vehicle body vibration. The shock absorber allows mechanically generating a low damping force with respect to a high-frequency vibration that cannot be reduced by the damping force adjusting unit. This allows insulating the vibration from the wheel side so as to effectively reduce the vehicle body vibration and dramatically improve the ride comfort in the vehicle.

The embodiments of the present invention described above are merely illustration of some application examples of the present invention and the technical scope of the present invention is not limited to the specific constructions of the above embodiments.

This application is based on and claims priority to Japanese Patent Application No. 2013-060604 filed with Japan Patent Office on Mar. 22, 2013, the entire content of which is incorporated herein by reference.

The invention claimed is:
1. A shock absorber, comprising:
a cylinder;
a piston slidably inserted into the cylinder, the piston defining an expansion side chamber and a pressure side chamber inside the cylinder;
a reservoir;
a suction passage that allows only a flow of liquid from the reservoir toward the pressure side chamber;

a rectifying passage that allows only a flow of liquid from the pressure side chamber toward the expansion side chamber;

a damping force adjusting unit that allows only a flow of liquid from the expansion side chamber toward the reservoir, the damping force adjusting unit being configured to change resistance provided to the flow of liquid;

a housing that forms a pressure chamber; and a free piston slidably inserted into the pressure chamber to form an expansion-side pressure chamber and a pressure-side pressure chamber inside the pressure chamber, the expansion-side pressure chamber communicating with the expansion side chamber, the pressure-side pressure chamber communicating with the pressure side chamber, wherein a pressure derived from the pressure side chamber acts on the free piston to press the free piston to one side in a sliding direction, and a pressure derived from the expansion side chamber acts on the free piston to press the free piston to another side in the sliding direction, and a pressure-side pressure-receiving area on which the pressure-side-chamber-derived pressure of the free piston acts is larger than an expansion-side pressure-receiving area on which the expansion-side-chamber-derived pressure of the free piston acts.

2. The shock absorber according to claim 1, wherein the pressure chamber includes a small-cross-sectional-area portion and a large-cross-sectional-area portion, the small-cross-sectional-area portion having a small area defined by a cross-sectional surface of an inner wall, the large-cross-sectional-area portion having a larger area defined by a cross-sectional surface of an inner wall than the area of the small-cross-sectional-area portion, the free piston includes: a small-piston portion slidably inserted into the small-cross-sectional-area portion of the pressure chamber; and a large-piston portion slidably inserted into the large-cross-sectional-area portion of the pressure chamber, the free piston defines a small chamber inside the small-cross-sectional-area portion using the small-piston portion, defines an outer peripheral chamber in an outer periphery of the small-piston portion inside the large-cross-sectional-area portion, and defines a large chamber inside the large-cross-sectional-area portion using the large-piston portion, one of the small chamber and the outer peripheral chamber is the expansion-side pressure chamber, and another communicates with the reservoir, and the large chamber is the pressure-side pressure chamber.

3. The shock absorber according to claim 1, further comprising:

a pressure-side first passage and a pressure-side second passage that communicate between the pressure-side pressure chamber and the pressure side chamber;

a first valve disposed in the pressure-side first passage, the first valve being configured to allow only a flow of liquid from the pressure-side pressure chamber toward the pressure side chamber while providing resistance to the flow; and a second valve disposed in the pressure-side second passage, the second valve being configured to allow only a flow of liquid from the pressure side chamber toward the pressure-side pressure chamber while providing resistance of the flow.

4. The shock absorber according to claim 3, further comprising:

a valve disc coupled to the housing via a coupling rod, the valve disc being disposed inside the pressure side chamber; and a cap mounted on an outer periphery of the coupling rod, the cap fitting the valve disc to define a room inside the pressure side chamber, wherein the pressure-side pressure chamber communicates with the room via a rod internal passage formed inside the coupling rod, the valve disc includes a first port and a second port that communicate between the room and the pressure side chamber, the pressure-side first passage is formed by the first port and the rod internal passage, the pressure-side second passage is formed by the second port and the rod internal passage, on a side of the pressure side chamber in the valve disc, the first valve is formed by laminating a leaf valve configured to open and close the first port, and on a side of the room in the valve disc, the second valve is formed by laminating a leaf valve configured to open and close the second port.

5. The shock absorber according to claim 3, further comprising:

a valve disc housed in a hollow portion disposed inside the housing, the valve disc partitioning the hollow portion into the pressure chamber and an empty portion, the empty portion communicating with the pressure side chamber, wherein the valve disc includes a first port and a second port that communicate between the empty portion and the pressure-side pressure chamber, the pressure-side first passage is formed by the first port, the pressure-side second passage is formed by the second port, on a side of the empty portion in the valve disc, the first valve is formed by laminating a leaf valve configured to open and close the first port, and on a side of the pressure-side pressure chamber in the valve disc, the second valve is formed by laminating a leaf valve configured to open and close the second port.

6. The shock absorber according to claim 1, further comprising a cushioning member configured to prevent a collision between the free piston and the housing.

7. The shock absorber according to claim 1, further comprising a fluid-pressure cushioning mechanism configured to reduce a collision between the free piston and the housing.

8. The shock absorber according to claim 1, further comprising:

an outer pipe disposed outside the cylinder; and an intermediate pipe disposed between the cylinder and the outer pipe, wherein the housing fits end portions of the cylinder and the intermediate pipe, the reservoir is formed between the intermediate pipe and the outer pipe, a gap is provided between the cylinder and the intermediate pipe forms a discharge passage, the discharge passage causing the expansion side chamber to communicate with the reservoir, the damping force adjusting unit is disposed between the discharge passage and the reservoir, the expansion-side pressure chamber communicates with the expansion side chamber via the discharge passage.

9. The shock absorber according to claim 2, wherein the housing includes:
- a case member that includes a hollow portion into which the free piston is inserted movably in an above-below direction; and
- a lid member that obstructs the hollow portion of the case member so as to form the pressure chamber.

* * * * *